US006112168A

United States Patent [19]
Corston et al.

[11] Patent Number: 6,112,168
[45] Date of Patent: Aug. 29, 2000

[54] AUTOMATICALLY RECOGNIZING THE DISCOURSE STRUCTURE OF A BODY OF TEXT

[75] Inventors: Simon Corston; Miguel Cardoso de Campos, both of Seattle, Wash.

[73] Assignee: Microsoft Corporation, Redmond, Wash.

[21] Appl. No.: 08/954,566

[22] Filed: Oct. 20, 1997

[51] Int. Cl.[7] .................................................. G06F 17/27
[52] U.S. Cl. ........................................................... 704/9
[58] Field of Search ..................... 704/1, 9, 10; 707/530, 707/531, 532

[56] References Cited

U.S. PATENT DOCUMENTS

| | | | |
|---|---|---|---|
| 4,887,212 | 12/1989 | Zamora et al. | 364/419 |
| 4,914,590 | 4/1990 | Loatman et al. | 364/419 |
| 5,377,103 | 12/1994 | Lamberti et al. | 704/9 |
| 5,528,491 | 6/1996 | Kuno et al. | 364/419.08 |
| 5,642,520 | 6/1997 | Takeshita et al. | 704/1 |
| 5,694,523 | 12/1997 | Wical | 395/12 |
| 5,794,050 | 8/1998 | Gahlgren et al. | 704/1 |

FOREIGN PATENT DOCUMENTS

| | | | |
|---|---|---|---|
| 09198366 | 7/1997 | Japan | G06F 15/18 |

OTHER PUBLICATIONS

Lombardo et al., "Syntactic Trees and Compact Representations in Natural Language Processing," in *Proceedings of the Sixth International Conference on Artificial Intelligence*, AIMSA, Singapore, 1994, pp. 333–342.

Marcu, Daniel, "Building Up Rhetorical Structure Trees," in *Proceedings of the Thirteenth National Conference on Artificial Intelligence and the Eighth Innovative Applications of Artificial Intelligence Conference*, National Conference on Artificial Intelligence, Portland, OR, Aug. 4–8, 1996, pp. 1069–1074.

Winograd, Terry, "Computer Software for Working with Language," *Scientific American* 251(3):91–101, 1984.

William C. Mann and Sandra A. Thompson, "Relational Propositions in Discourse," *Discourse Processes*, vol. 9, 1986, pp. 57–90.

William C. Mann and Sandra A. Thompson, "Rhetorical Structure Theory: Toward a Functional Theory of Text Organization," *Text*, vol. 8, No. 3, 1988, pp. 243–281.

Daniel Marcu, "Building Up Rhetorical Structure Trees," *Proceedings of the Thriteenth National Conference on Artificial Intelligence*, vol. 2, Aug. 1996, pp. 1069–1074.

Daniel Marcu, "The Rhetorical Parsing of Natural Language Texts," *Proceedings of the Thirty–Fifth Annual Meeting of the Association for Computational Linguistics*, 1997, pp. 96–103.

Daniel Marcu, "From Discourse Structures to Text Summaries," *Proceedings of the ACL '97/EACL '97 Workshop on Intelligent Scaleable Text Summarization*, Jul. 1997, pp. 82–88.

*Primary Examiner*—Forester W. Isen
*Assistant Examiner*—Patrick N. Edouard
*Attorney, Agent, or Firm*—Joseph R. Kelly; Westman, Champlin & Kelly P.A.

[57] ABSTRACT

The present invention is directed to recognizing a discourse structure of a body of text. In a preferred embodiment, a discourse structure recognition facility utilizes syntactic information associated with the body of text to generate a discourse structure tree that characterizes the discourse structure of the body of text. The facility first identifies in the body of text a number of clauses. The facility then determines, for each distinct pair of clauses, which of a number of possible discourse relations should be hypothesized between the pair of clauses, based on the syntactic structure and semantic of the body of text relative to the pair of clauses. The facility then applies the hypothesized relations to the clauses in order to produce a discourse structure tree characterizing the discourse structure of the body of text. In certain embodiments, the facility further generates from the produced discourse structure tree a synopsis of the body of text reflecting the primary goals pursued by its author.

38 Claims, 18 Drawing Sheets

AUTOMATICALLY RECOGNIZING THE DISCOURSE STRUCTURE OF A BODY OF TEXT

TECHNICAL FIELD

The invention relates generally to the field of computational linguistics, and, more specifically, to the field of discourse processing.

BACKGROUND OF THE INVENTION

Discourse theory is an approach to understanding the content and significance of natural language documents and other units of natural language. According to discourse theory, each natural language document has a "discourse structure" that reflects the purposes of the document's author in authoring the document. Discerning the discourse structure of a natural language document is commonly regarded as an important component of understanding the document.

The discourse structure of documents is frequently modeled using hierarchical "discourse structure trees," or simply "trees," such as the "rhetorical structure theory trees" ("RST trees") proposed by Mann and Thompson, "Relational Propositions in Discourse," *Discourse Processes* 9:57–90 (1986). Such discourse structure trees characterize the relative significance of the constituent segments of the documents, called "propositions." These propositions are generally clauses or phrases. A discourse structure tree identifies the relationships, or "discourse relations," that exist between propositions in the document.

Discourse structure trees are typically generated manually, at significant cost, by experts trained as linguists. Because the manual generation of discourse structure trees is expensive, they remain a largely a theoretical tool used to study discourse in general. An automated approach to inexpensively generating discourse structure trees representing the discourse structure of natural language documents, however, would permit the application of discourse theory to the analysis of arbitrary documents.

SUMMARY OF THE INVENTION

The invention is directed to automatically recognizing the discourse structure of a body of text or other natural language expression. The discourse structure exhibited by a body of text is the organization, or "structure," of the multiple-word textual elements, or "propositions," from which the body of text is constructed. Recognizing the discourse structure of a body of text helps to facilitate the discovery of the author's goals in writing the body of text, and thus helps in some senses to identify the central meaning of the body of text.

In order to recognize the discourse structure of an input text, the facility generates one or more discourse structure trees. As discussed herein, a discourse structure tree is a data structure representing the discourse structure of an input text. The input text is generally devisable into a series of clauses. While the discourse structure trees generated by the facility for the input text, strictly speaking, characterize the discourse structure between the propositions that are the logical representation of these clauses, the facility generates the discourse structure trees based upon the content of the clauses, rather than on the basis of any rigorous logical representations of the clauses that might be properly termed propositions. Thus, the facility's generation of discourse structure trees is not reliant upon the generation of rigorous logical propositions from the clauses of the input text.

In accordance with the invention, the facility receives the input text, as well as data produced by performing a rigorous syntactic parse of the input text. This data preferably includes one or more syntactic parse graphs representing the syntactic structure of the input text, and corresponding logical forms, which provide a normalized view of this syntactic structure including semantic information. The facility uses the logical forms to divide the input text into clauses. These clauses are ultimately arranged in a discourse structure tree, where they are connected by discourse relations in a particular configuration indicating the discourse structure of the input text.

After identifying the clauses in the input text, the facility considers these clauses in pairs. It is important to note that the facility attempts to hypothesize discourse relations between every pair of clauses, not merely between adjacent clauses. For each pair of clauses, the facility uses a set of cues to identify the discourse relations that might reasonably relate the clauses of the pair. These identified relations are said to be "hypothesized" between the clauses of the pair. The cues used specify one or more levels of conditions that must be satisfied by the clauses of the pair, or by the contents of the logical form or syntactic parse relative to clauses of the pair, in order for a particular relation to be hypothesized between the pair. The cues further each specify a quantitative score indicating the relative likelihood that the relation hypothesized between the pair is correct where the cue's conditions are satisfied. When several cues for the same relation are satisfied for the same pair of clauses, the scores specified by those cues are added to yield the score for the hypothesized relation.

After the facility has hypothesized relations between each pair of clauses, the facility groups the hypothesized relations in "bags" each containing all of the hypothesized relations between a given pair of clauses. Hypothesized relations are ordered in each bag in decreasing order of their scores. The bags themselves are, in turn, ordered in decreasing order of the scores of their first hypothesized relation, i.e., the highest single score in the bag. The facility then proceeds to construct one or more discourse structure trees in a bottom-up manner from terminal nodes corresponding to the clauses by attempting to apply the hypothesized relations to the terminal nodes in a manner that iterates first through the first hypothesized relation in each bag, then through successive hypothesized relations in each bag. The construction algorithm utilizes backtracking in its traversal of the bags in order to prune from consideration groups of trees that would not be well-formed. Each time a hypothesized relation actually combines two nodes, the resulting combination is added to the tree as a non-terminal node. The new node has a score equal to the score of the hypothesized relation, plus the scores, if any, of the nodes that are combined. Thus, every tree constructed in this manner has a score, associated with its root node, that reflects the relative likelihood that the tree is the correct one for the input text.

Each tree constructed in this manner is a binary-branching tree, in which each non-terminal node has exactly two children. As n-ary-branching discourse structure trees are considered, in some respects, to be more useful than binary-branching discourse structure trees, the facility preferably "flattens" the constructed binary-branching trees to form n-ary-branching trees.

The facility may further generate from any of the trees constructed in this manner a synopsis of the input text reflecting the primary goals pursued by the author. To do so, the facility performs a breadth-first traversal of the tree from its head to a specified depth, concatenating to the summary the text of the clause represented by each visited node.

Thus, the facility of the present invention preferably hypothesizes discourse relations between clauses on the basis of the text of the clauses, without relying upon manually-generated propositional representations of the input text, utilizing robust cues that test syntactic and semantic characteristics of the text of the clauses; applies hypothesized discourse relations to generate discourse relation trees in an order based upon their segregation into bags and utilizing backtracking; flattens binary-branching discourse structure trees into n-ary-branching discourse structure trees; and generates from generated discourse structure trees a synopsis of the input text.

DETAILED DESCRIPTION OF THE INVENTION

The invention is directed to automatically recognizing the discourse structure of a body of text or other natural language expression. The discourse structure exhibited by a body of text is the organization, or "structure," of the multiple-word textual elements, or "propositions," from which the body of text is constructed. Recognizing the discourse structure of a body of text helps to facilitate the discovery of the author's goals in writing the body of text, and thus helps in some senses to identify the central meaning of the body of text.

In order to recognize the discourse structure of a body of text ("input text"), the facility generates one or more discourse structure trees. As discussed herein, a discourse structure tree is a data structure representing the discourse structure of an input text. The input text is generally devisable into a series of clauses. While the discourse structure trees generated by the facility for the input text, strictly speaking, characterize the discourse structure between the propositions that are the logical representation of these clauses, the facility generates the discourse structure trees based upon the content of the clauses, rather than on the basis of any rigorous logical representations of the clauses that might be properly termed propositions. Thus, the facility's generation of discourse structure trees is not reliant upon the generation of rigorous logical propositions from the clauses of the input text.

Figure 18:
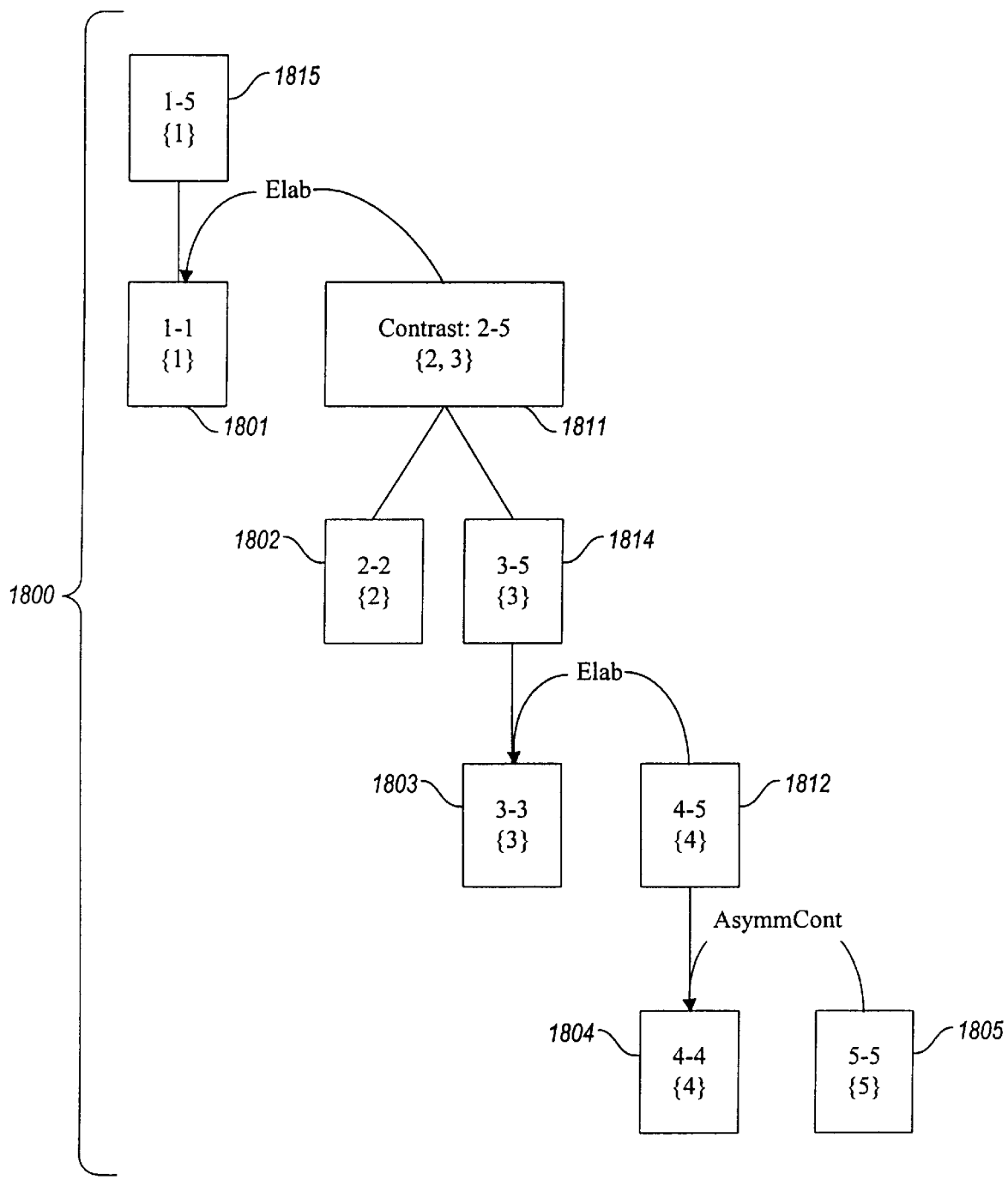
FIG. 18 is a discourse structure tree diagram showing the first complete discourse structure tree generated by the facility.

A sample discourse structure tree, discussed in greater detail below, is shown in FIG. 18. A discourse structure tree contains a number of nodes arranged in a tree. Each node represents, or "covers," a contiguous set, or "span" of clauses. Each node further identifies the most important nodes, called "projections," among the clauses that it covers. The leaves, or "terminal nodes," of a discourse structure tree each correspond to a single clause. The non-terminal nodes of a discourse structure tree, on the other hand, correspond to multiple clauses combined, or "related," by one or more discourse relations. One non-terminal node, called "root node," covers all of the clauses, and has all of the terminal nodes among its descendants.

A number of different types of discourse relations are used to represent the kinds of relationships that can occur between clauses (or between groups of clauses). These discourse relation types are divided into two categories: asymmetric discourse relation types and symmetric discourse relation types. Asymmetric discourse relations relate clauses in a way that demonstrates that the author regards the clauses as having different levels of importance within the input text. The clauses related by an asymmetric discourse relation thus (1) include a more important, "nucleus," clause and a less important, "satellite," clause, and (2) have as their list of their projections only the projections of their nucleus child. As an example, clauses A and B below are related by an ELABORATION relation describing two clauses, the satellite of which elaborates on the nucleus, in which the node representing clause A is the nucleus and the node representing clause and B is the satellite:

A. Binoculars enable their users to view scenes at a distance.

B. They are used, for example, by birdwatchers to avoid disturbing their avian subjects.

FIG. 18 shows representations of three asymmetric relations: an ASYMMETRIC CONTRAST relation represented in node 1812 having node 1804 as its nucleus and node 805 as its satellite; an ELABORATION relation represented in node 1814 having node 803 as its nucleus and node 1812 as its satellite; and an ELABORATION relation represented in node 1815 having node 1801 as its node as its nucleus and node 1811 as its satellite.

Symmetric discourse relations, on the other hand, relate clauses in a way that demonstrates that the author regards the clauses as having similar importance within the input text. As such, nodes representing symmetric discourse relations (1) have only nuclei as children, and (2) have as their list of projections the union of the projections of their children. As an example, clauses C and D below are related by a SEQUENCE relation describing an ordered succession of clauses, in which nodes representing clauses C and D are both nucleus children:

C. First, beat the egg whites.

D. Then, fold in the sugar.

FIG. 18 shows a representation of one symmetric relation: a CONTRAST relation represented by node 1811 having as its nuclei nodes 1802 and 1814. Formally, a valid, or "well-formed," discourse structure tree exhibits four characteristics: (1) "completeness," i.e., the discourse structure tree covers the entire input text; (2) "connectedness," i.e., the discourse structure tree contains a terminal node for each clause of the input text; (3) "uniqueness," i.e., each node in the discourse structure tree has a single parent; and (4) "adjacency," i.e., only adjacent spans may be grouped together node to form larger spans—that is, non-terminal nodes in the discourse structure tree must cover only contiguous spans.

In accordance with the invention, the facility receives as its input the input text, as well as data produced by performing a rigorous syntactic parse of the input text. This data preferably includes one or more syntactic parse graphs representing the syntactic structure of the input text, and corresponding logical forms, which provide a normalized view of this syntactic structure including semantic information. The facility uses the logical forms to divide the input text into clauses. These clauses are ultimately arranged in a discourse structure tree, where they are connected by discourse relations in a particular configuration indicating the discourse structure of the input text.

After identifying the clauses in the input text, the facility considers these clauses in pairs. It is important to note that the facility attempts to hypothesize discourse relations between every pair of clauses, not merely between adjacent clauses. For each pair of clauses, the facility uses a set of cues to identify the discourse relations that might reasonably relate the clauses of the pair. These identified relations are said to be "hypothesized" between the clauses of the pair. The cues used specify one or more levels of conditions that must be satisfied by the clauses of the pair, or by the contents of the logical form or syntactic parse relative to clauses of the pair, in order for a particular relation to be hypothesized between the pair. The cues further each specify a quantitative score indicating the relative likelihood that the relation hypothesized between the pair is correct where the cue's conditions are satisfied. When several cues for the same relation are satisfied for the same pair of clauses, the scores specified by those cues are added to yield the score for the hypothesized relation.

After the facility has hypothesized relations between each pair of clauses, the facility groups the hypothesized relations in "bags" each containing all of the hypothesized relations between a given pair of clauses. Hypothesized relations are ordered in each bag in decreasing order of their scores. The bags themselves are, in turn, ordered in decreasing order of the scores of their first hypothesized relation, i.e., the highest single score in the bag. The facility then proceeds to construct one or more discourse structure trees in a bottom-up manner from terminal nodes corresponding to the clauses by attempting to apply the hypothesized relations to the terminal nodes in a manner that iterates first through the first hypothesized relation in each bag, then through successive hypothesized relations in each bag. The construction algorithm utilizes backtracking in its traversal of the bags in order to prune from consideration groups of trees that would not be well-formed. Each time a hypothesized relation actually combines two nodes, the resulting combination is added to the tree as a non-terminal node. The new node has a score equal to the score of the hypothesized relation, plus the scores, if any, of the nodes that are combined. Thus, every tree constructed in this manner has a score, associated with its head node, that reflects the relative likelihood that the tree is the correct one for the input text.

Each tree constructed in this manner is a binary-branching tree, in which each non-terminal node has exactly two children. As n-ary-branching discourse structure trees are considered, in some respects, to be more useful than binary-branching discourse structure trees, the facility preferably "flattens" the constructed binary-branching trees to form n-ary-branching trees.

The facility may further generate from any of the trees constructed in this manner a synopsis of the input text reflecting the primary goals pursued by the author. To do so, the facility performs a breadth-first traversal of the tree from its head to a specified depth, concatenating to the summary the text of the clause represented by each visited node.

Figure 1:
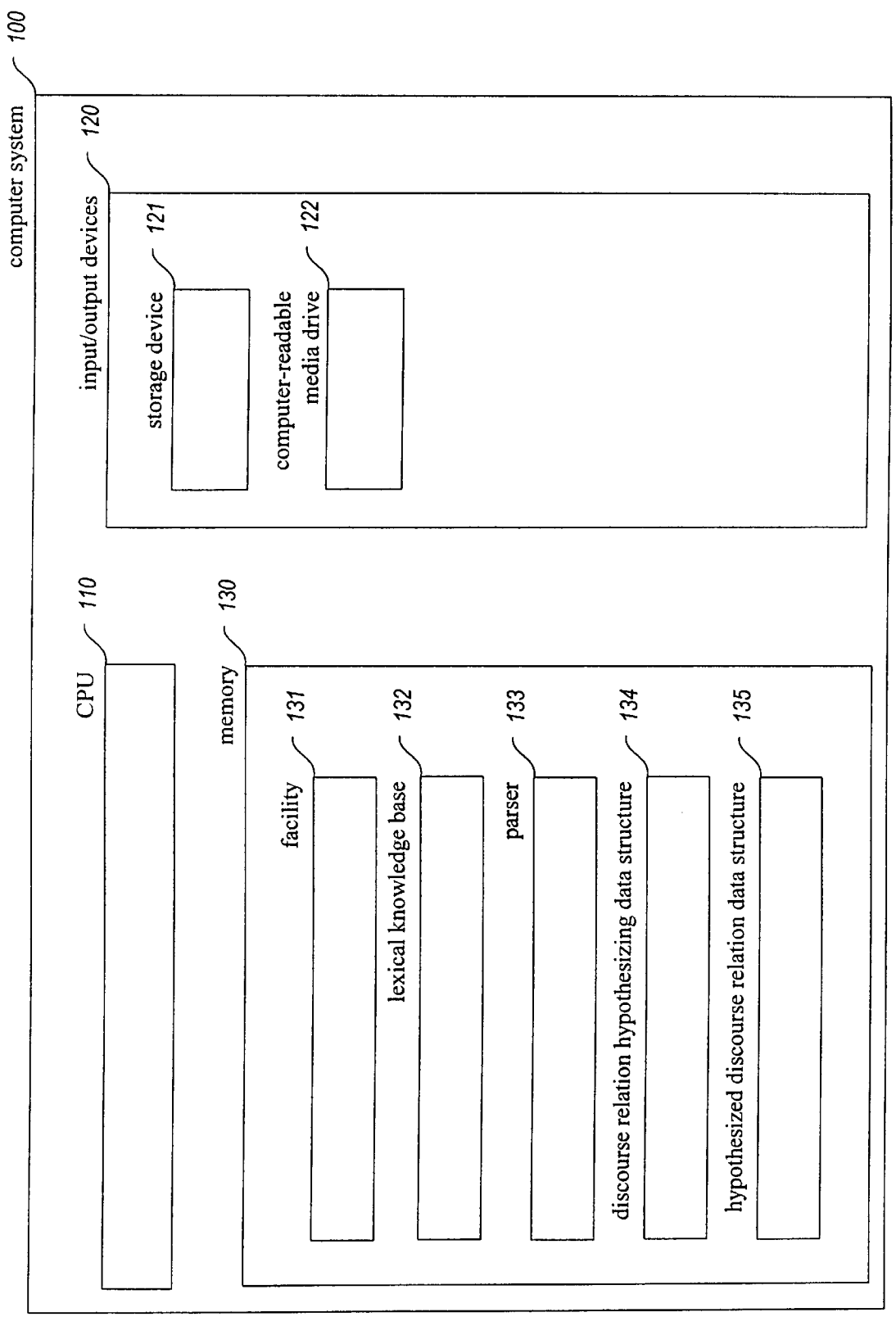
FIG. 1 is a high-level block diagram of the general-purpose computer system upon which the facility preferably executes.

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices is a storage device 121, such as a hard disk drive, and a computer-readable media drive 122, which can be used to install software products, including the facility, which are provided on a computer-readable medium, such as a CD-ROM. The memory 130 preferably contains the discourse structure recognition facility ("facility") 131; a lexical knowledge base 132 containing lexical and semantic information relating to the natural language in which the input text is expressed; a parser 133 for deriving from the input text morphological, syntactic, and semantic information inherent therein, including logical forms; a discourse relation hypothesizing data structure 134 used in order to hypothesize discourse relations that may relate pairs of clauses within the input text; and a hypothesized discourse relation data structure 135 used by the facility to represent the set of discourse relations hypothesized between the clauses of the input text and to construct discourse structure trees representing the discourse structure of the input text. Because the parser 133 and the facility 131 can together identify the morphological, syntactic, semantic, and discourse structure of the input text, the parser and facility are collectively known as a natural language processing system for identifying the morphological, syntactic, semantic, and discourse structure of a natural language input text. While the facility is preferably implemented on a computer system configured as described above, those skilled in the art will recognize that it may also be implemented on computer systems having different configurations.

Figure 2:
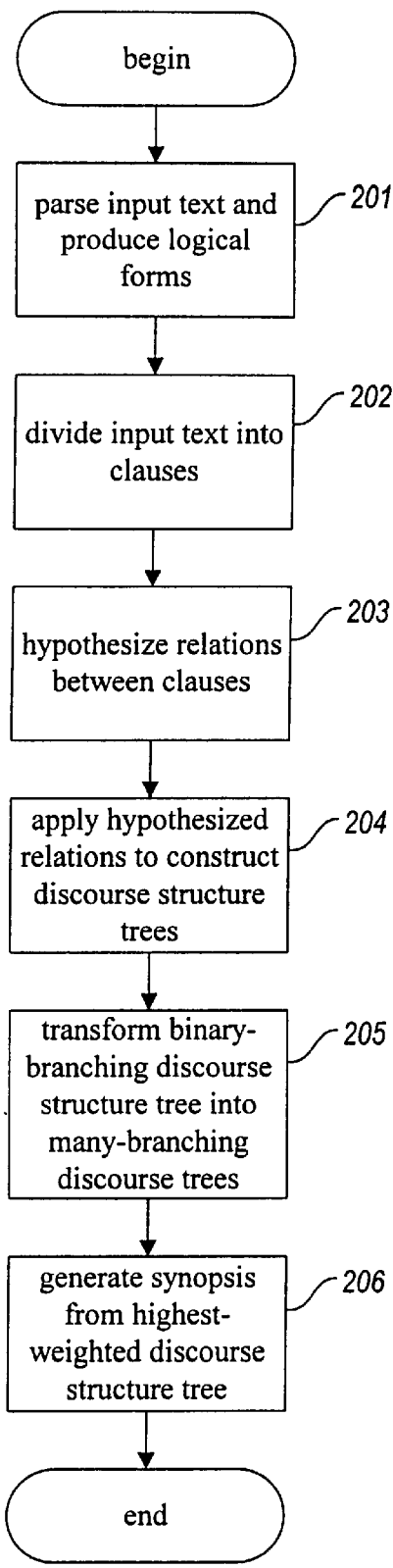
FIG. 2 is a high-level flow diagram showing an overview of the steps performed by the facility in order to generate one or more discourse structure trees for an input text and generate a synopsis of the input text.

FIG. 2 is a high-level flow diagram showing an overview of the steps performed by the facility in order to generate one or more discourse structure trees for an input text and generate a synopsis of the input text. In step 201, the facility parses the input text and produces a parse tree and logical forms. For a detailed discussion of parsing natural language input text, refer to U.S. patent application Ser. No. 08/265,845, entitled "METHOD AND SYSTEM FOR BOOTSTRAPPING STATISTICAL PROCESSING INTO A RULE-BASED NATURAL LANGUAGE PARSER." For a detailed description of generating logical forms from natural language input text, refer to U.S. patent application Ser. No. 08/674,610, entitled "METHOD AND SYSTEM FOR COMPUTING SEMANTIC LOGICAL FORMS FROM SYNTAX TREES." These two applications are hereby incorporated by reference in their entirety.

In step 202, the facility uses the logical forms generated in step 201 to identify the clauses within the input text. In step 203, the facility uses a set of cues to hypothesize possible discourse relations between pairs of the clauses identified in step 202. In step 204, the facility applies the relations hypothesized in step 203 in order to construct one or more discourse structure trees for the input text. A score is generated for each discourse structure tree indicating the relative likelihood that that discourse structure tree correctly models the discourse structure of the input text. In step 205, the facility "flattens" the binary-branching discourse structure trees constructed in step 204 to transform them into the more common n-ary-branching trees. In step 206, the facility generates from the highest-weighted discourse structure tree a synopsis of the sample input text containing the most important clauses of the input text. After step 206, these steps conclude.

In order to describe the facility more completely, its operation is described in detail hereinafter with reference to a simple example. The sample input text for the example is shown in Text Block 1.

---

Text Block 1: Sample Input Text

The aardwolf is classified as *Proteles cristatus*. It is usually placed in the hyena family, Hyaenidae. Some experts, however, place the aardwolf in a separate family, Protelidae, because of certain anatomical differences between the aardwolf and the hyena. For example, the aardwolf has five toes on its forefeet, whereas the hyena has four.

---

In accordance with step 201, the facility first parses each sentence of the sample input text, generating for each sentence both a parse tree and a logical form. FIGS. 3–10 show the parse trees and logical forms for the four sentences of the sample input text.

Figure 3:
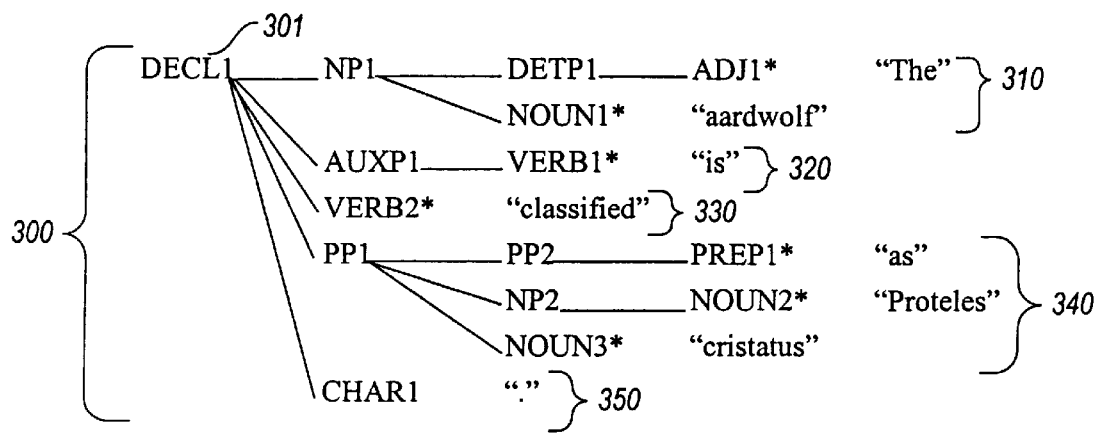
FIG. 3 is a parse tree diagram showing the parse tree produced for the first sentence of the sample input text.

FIG. 3 is a parse tree diagram showing the parse tree produced for the first sentence of the sample input text. The parse tree 300 characterizes the syntactic structure of the sentence as a whole. Branches of the parse tree attached to the head node 301 describe different components of the sentence. A noun phrase branch 310 describes the noun phrase "the aardwolf." An auxiliary phrase branch 320 describes the verb "is." A verb branch 330 describes the verb "classified." A prepositional phrase branch 340 describes the prepositional phrase "as Proteles cristatus." Finally, a punctuation branch 350 describes the period that ends the sentence.

Figure 4:
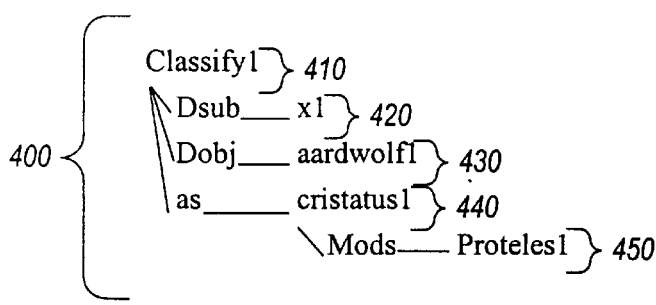
FIG. 4 is a logical form diagram showing the logical form graph generated for the first sentence of the sample input text.
Figure 5:
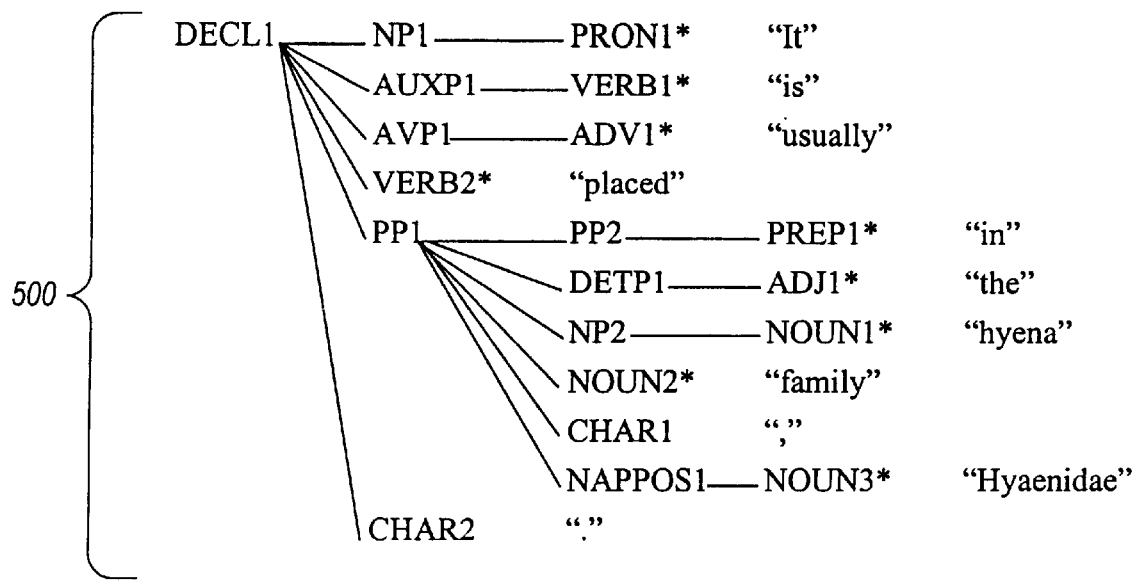
FIG. 5 is a parse tree diagram showing the parse tree generated for the second sentence of the sample input text.

FIG. 4 is a logical form diagram showing the logical form graph generated for the first sentence of the sample input text. The logical form 400 describes the syntactic organization of the sentence in a more abstract way than the parse tree. A logical form is based on a relatively small number of syntactic-semantic relations via which a verb may be modified by other words in a sentence. Several of the labels used to identify these relations are described in Table 1. Additional such labels are described in U.S. patent application Ser. No. 08/674,610.

TABLE 1

Labels Used in Logical Forms

| Label | Meaning |
|---|---|
| Dsub | "Deep subject." (a) The subject of an active clause or (b) the agent of a passive or unaccusative construction. |
| Dobj | "Deep object." (a) The object of an active clause or (b) the subject of an unaccusative construction. |
| TmeAt | A temporal relation. This same label is used for points in time as well as durations. |
| Instr | Instrument. |
| Manr | Manner. |
| Mods | Modifier. |
| LocAt | Location. |
| Goal | A spatial goal. |

The logical forms generated by parsing the input text are used by the facility (1) to determine how to divide the input text into clauses, and (2) to test the conditions of the cues when hypothesizing discourse relations between clauses.

Figure 6:
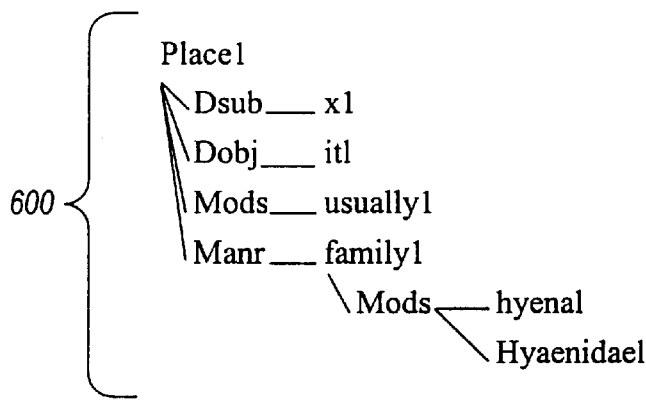
FIG. 6 is a logical form diagram showing the logical form graph generated by the facility for the second sentence of the sample input text.
Figure 7:
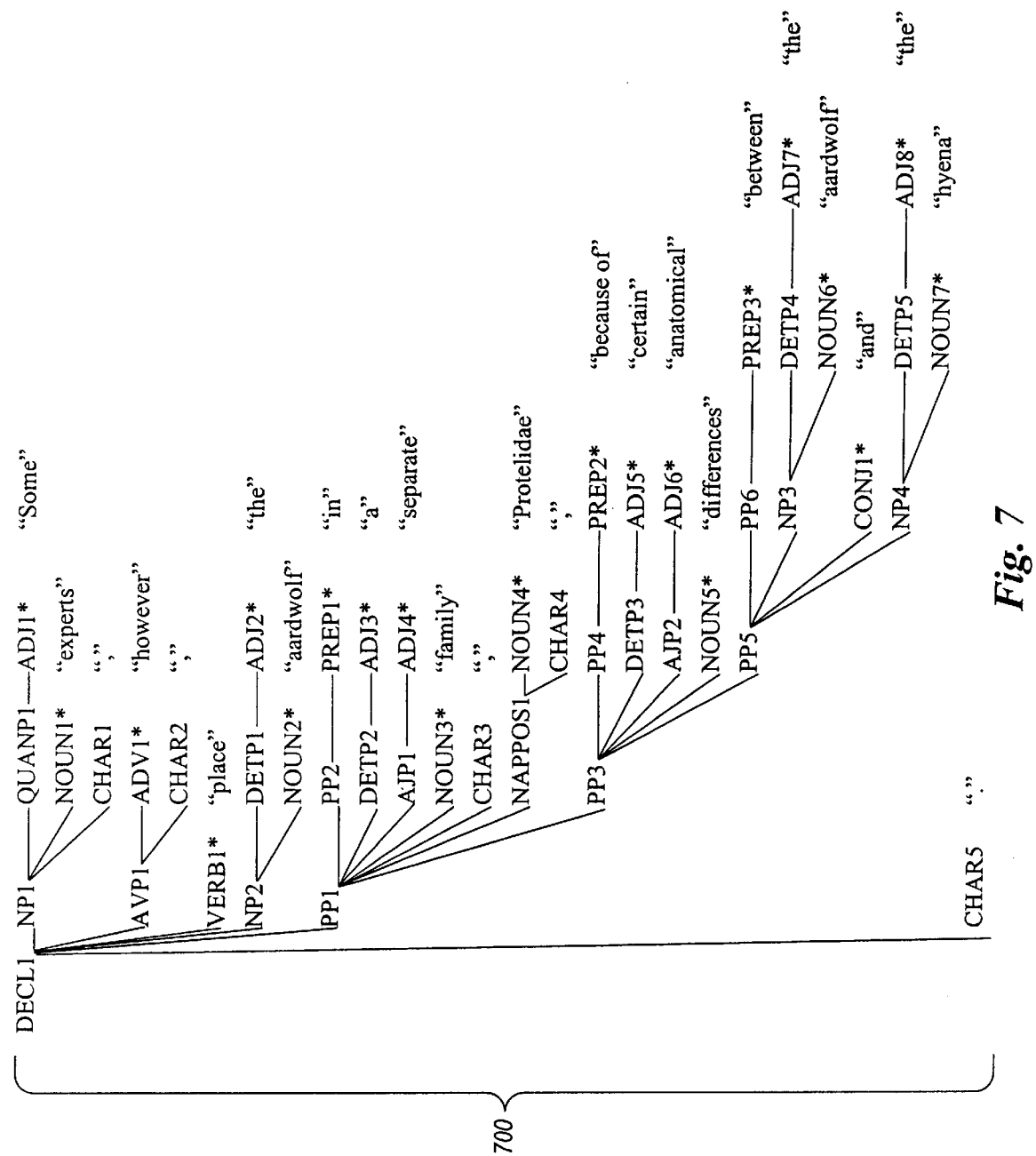
FIG. 7 is a parse tree diagram showing the parse tree generated for the third sentence of the sample input text.
Figure 8:
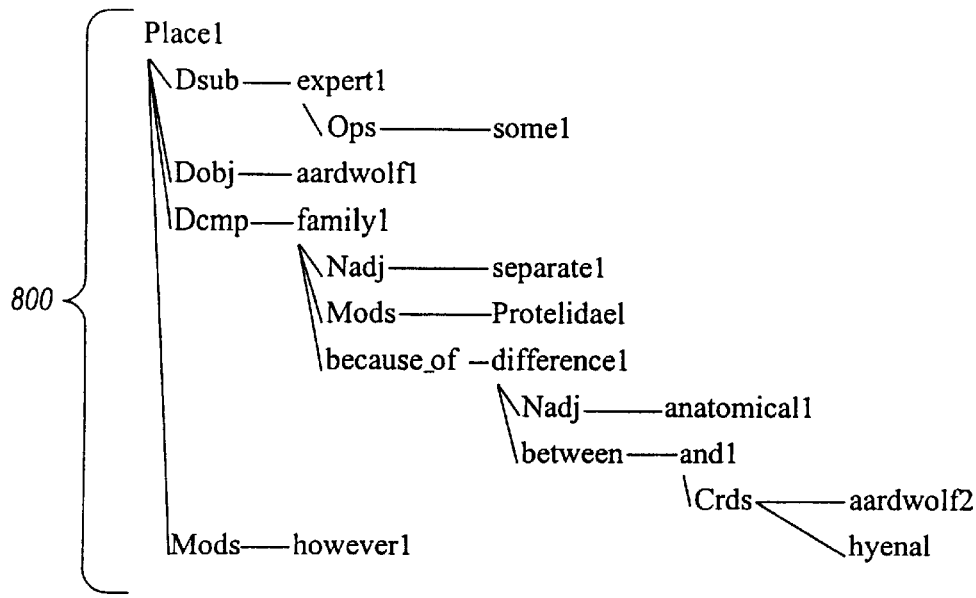
FIG. 8 is a logical form diagram showing the logical form graph generated by the facility for the third sentence of the sample input text.
Figure 9:
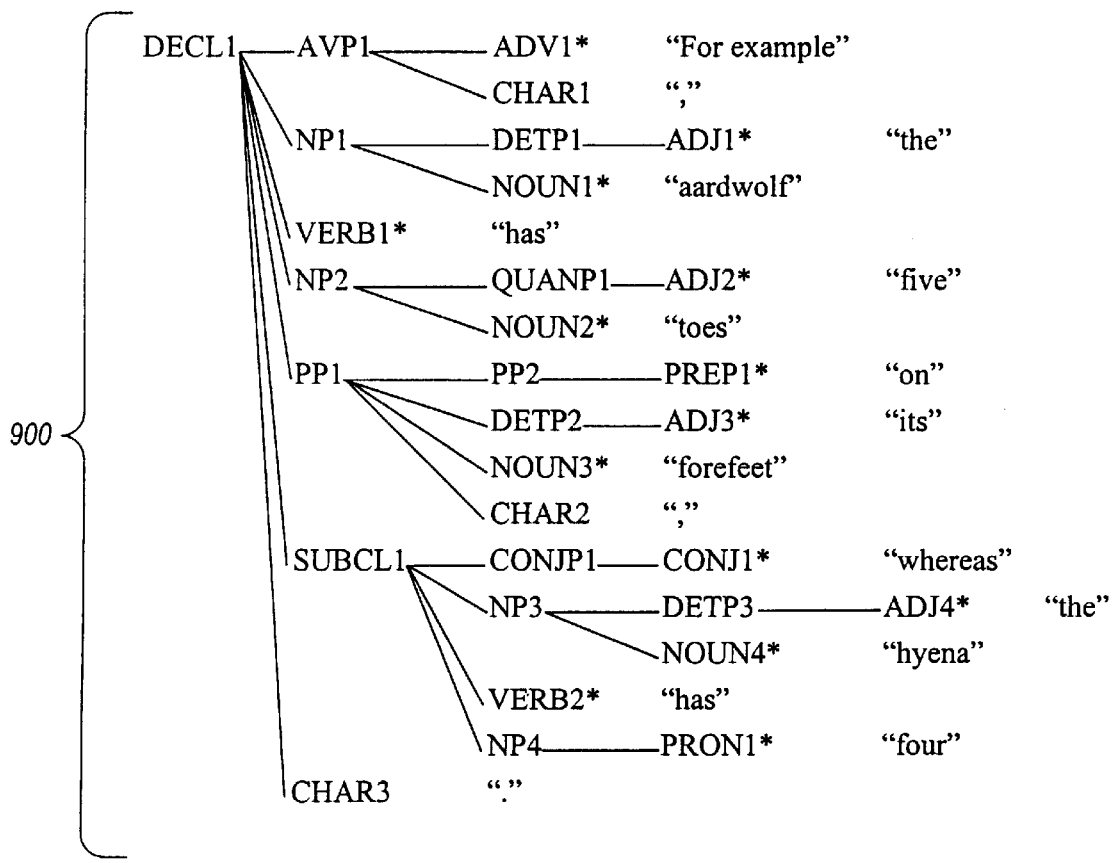
FIG. 9 is a parse tree diagram showing the parse tree generated for the fourth sentence of the sample input text.
Figure 10:
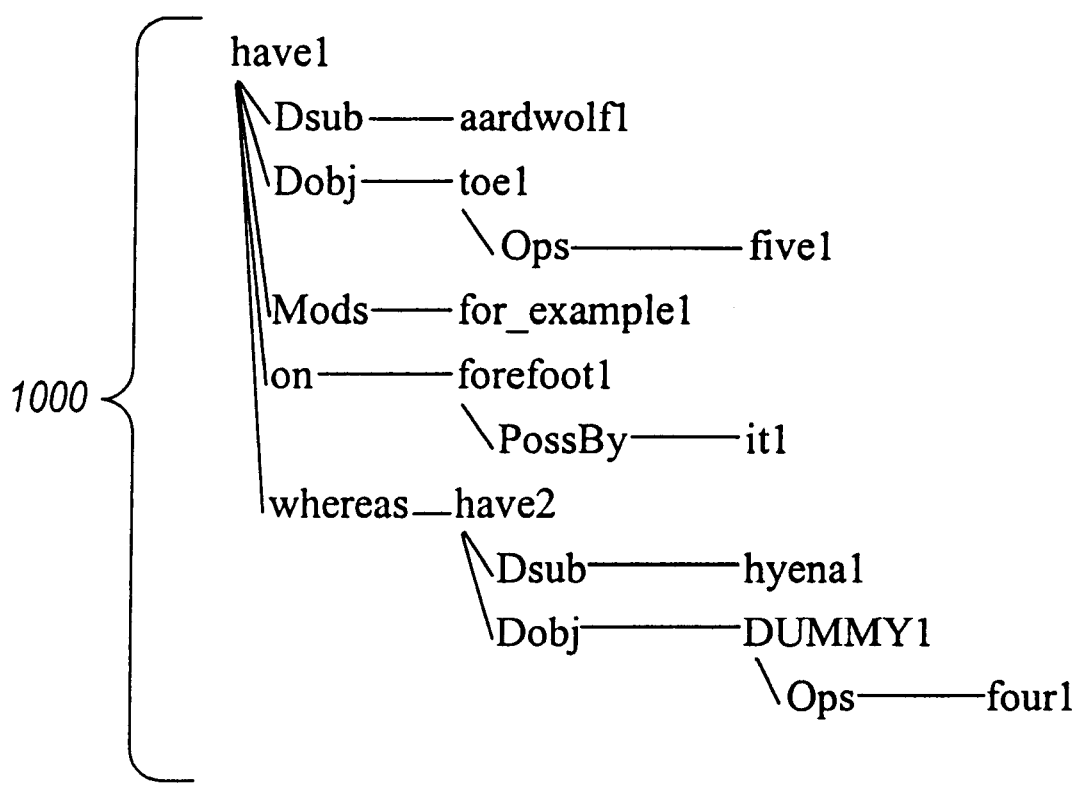
FIG. 10 is a logical form diagram showing the logical form graph generated by the facility for the fourth sentence of the sample input text.

Like FIG. 3, FIGS. 5, 7, and 9, are parse tree diagrams showing the parse trees generated for the second, third, and fourth sentences of the sample input text, respectively. Similarly, FIGS. 6, 8, and 10 are logical form diagrams showing the logical form graphs generated by the facility for the second, third, and fourth sentences of the sample input text, respectively.

After the facility has parsed the sentences of the input text in accordance with step 201, the facility proceeds to identify the clauses occurring in the input text in accordance with step 202. The criteria used by the facility to identify clauses are shown in Table 2. Those skilled in the art will be familiar with the linguistics terminology used in Tables 2 and 4 below. For additional discussion of such terminology, the reader is directed to Finegan, Edward, *Language: Its Structure and Use*, Harcourt Brace Jovanovich, San Diego, 1989, and Fromkin, Victoria, and Robert Rodman, *An Introduction to Language*, Holt, Rinehart, and Winston, New York, 1988.

TABLE 2

Criteria for Identifying Clauses

| Criterion Number | Criterion |
|---|---|
| 1 | The head of the constituent is a verb or the constituent is an elliptical clause. |
| 2 | The head of the constituent is not an auxiliary. |
| 3 | An object complement is only allowed in the deontic "have to" construction, for example: "The pontiff allowed most of the English customs, but Henry had to bow to canon law . . . " |

TABLE 2-continued

Criteria for Identifying Clauses

| Criterion Number | Criterion |
|---|---|
| 4 | The constituent is not a subject complement. |
| 5 | If the parent of the constituent is an NP then the constituent can only be a terminal node in an RST diagram if it is a present participial clause. (This condition might appear odd since relative clauses, another kind of subordinate clause dependent on an NP, are not considered. The condition, however, is a simple workaround to a systematic parsing ambiguity in which a detached participial clause is incorrectly subordinated to an NP. For example: "This bold strategy gave them an advantage, thus creating confusion.") |
| 6 | If the constituent is a complement clause, then it cannot have an noun phrase or prepositional phrase as its parent. |
| 7 | The constituent cannot be a relative clause. |
| 8 | The constituent cannot have a relative clause as one of its ancestors (in order to avoid undue granularity). |
| 9 | Detached participial clauses whose head is a past participle cannot be terminal nodes. |

The facility exhaustively traverses the nodes of the generated logical forms, applying the criteria shown in Table 2 to each logical form node. For each logical form node satisfying all of the criteria, the facility identifies a separate clause.

In processing the sample input text of the example, the facility applies the criteria shown in Table 2 to the logical forms shown in FIGS. 4, 6, 8 and 10 to divide the sample input text into clauses as shown in Table 3.

TABLE 3

Identified Clauses

| Clause Number | Clause |
|---|---|
| 1 | The aardwolf is classified as *Proteles cristatus*. |
| 2 | It is usually placed in the hyena family, Hyaenidae. |
| 3 | Some experts, however, place the aardwolf in a separate family, Protelidae, because of certain anatomical differences between the aardwolf and the hyena. |
| 4 | For example, the aardwolf has five toes on its forefeet, |
| 5 | whereas the hyena has four. |

In the logical forms shown in FIGS. 4, 6, and 8 for the first, second, and third sentences of the sample input text, respectively, only the head node satisfies all of the clause identification criteria shown in Table 2. For this reason, each of the first three sentences is identified as comprising only a single clause. In the case of the logical form for the fourth sentence of the sample input text shown in FIG. 10, the clause identification criteria are satisfied both by the head node "have1" and an interior node, the "have2" node. The facility therefore divides the fourth sentence into two clauses, clause 4 and clause 5.

Figure 11A:
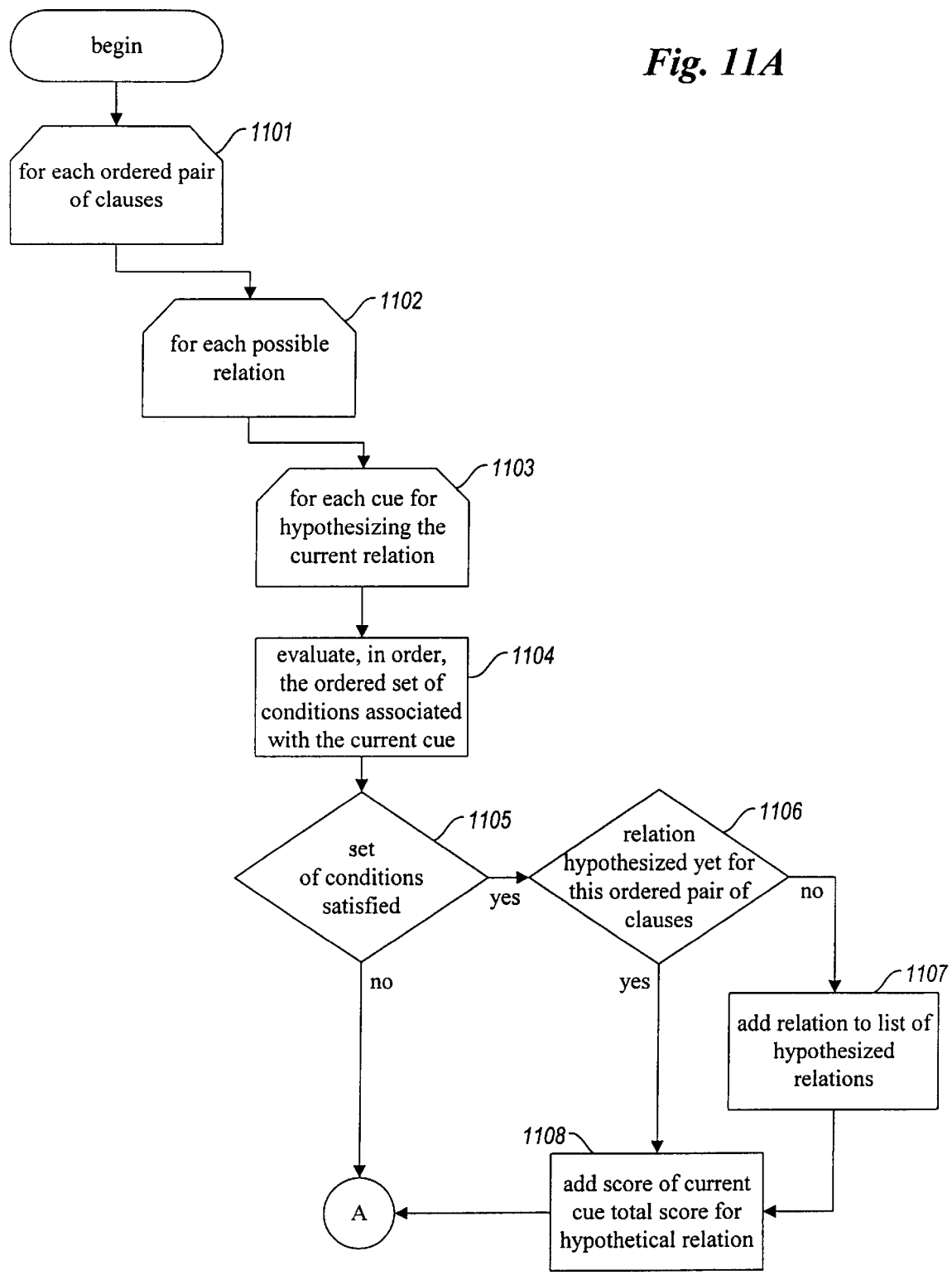
FIG. 11 is a flow diagram showing the steps preferably performed by the facility in order to hypothesize discourse relations between the clauses identified in the input text.
Figure 11B:
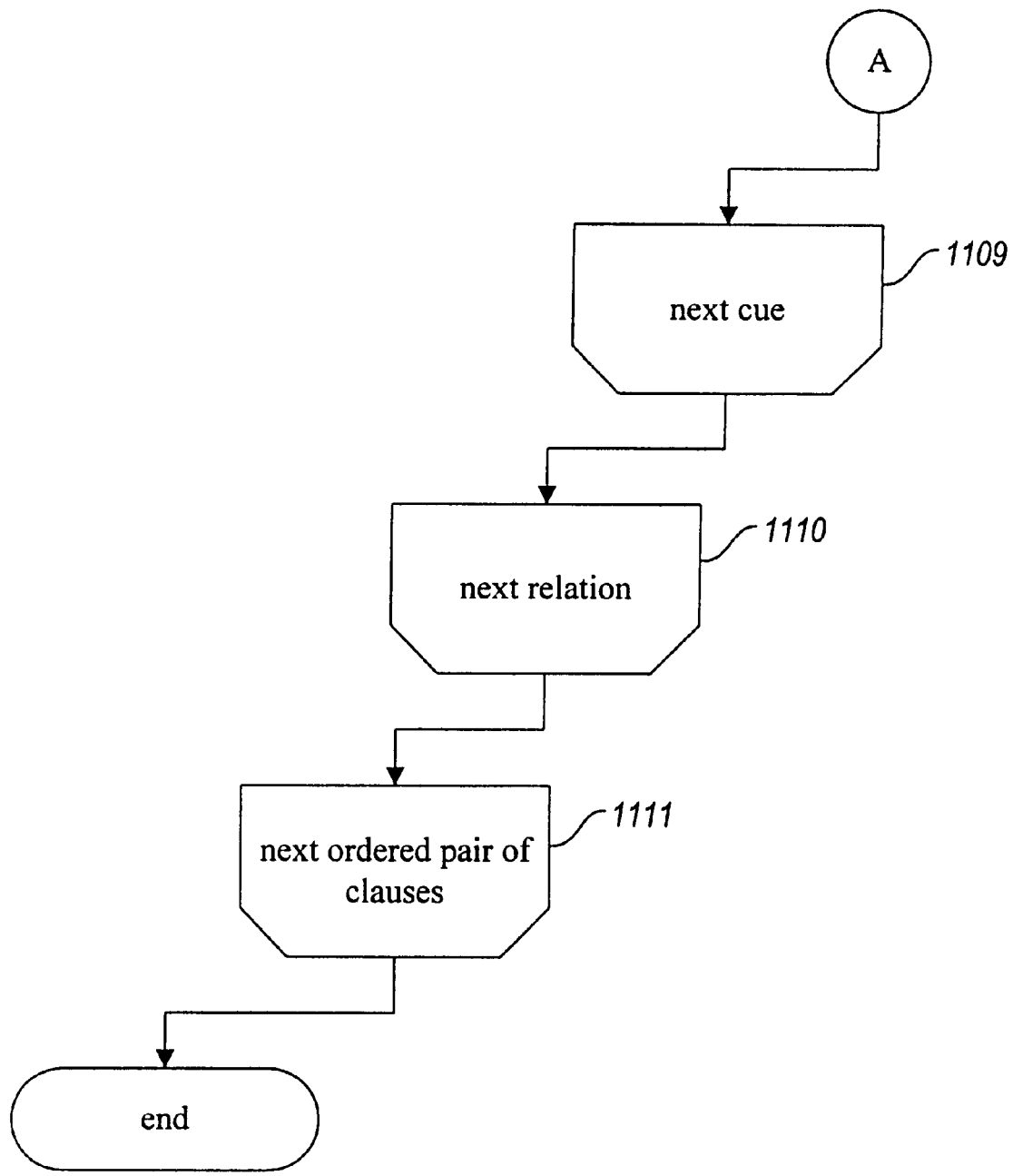

After the facility has identified the clauses occurring in the input text in accordance with step 202, the facility proceeds to hypothesize discourse relations between the identified clauses in accordance with step 203. FIG. 11 is a flow diagram showing the steps preferably performed by the facility in order to hypothesize discourse relations between the clauses identified in the input text. At a high level, to hypothesize discourse relations between the clauses, these steps evaluate the conditions associated with each cue for every pair of clauses to determine whether to hypothesize the relation associated with the cue for that pair of clauses. Because discourse relations are directional, for a given pair of clauses, the facility applies the conditions of the cues once to consider hypothesizing the relations in the forward direction, and again to consider hypothesizing the relations in the backward direction. This is shown in the flow diagram as looping through all of the ordered pairs of clauses, rather than merely looping through only the unordered pairs of clauses.

In steps 1101–1107, the facility loops through each ordered pair of identified clauses. For each ordered pair of identified clauses, in steps 1102–1110, the facility loops through each of the different discourse relation types. For each different discourse relation type, in steps 1103–1109, the facility loops through each discourse relation cue provided for the current discourse relation type. Table 4 shows a list of discourse relation cues preferably used by the facility. Each cue is an individual basis for asserting a particular discourse relation between an ordered pair of clauses. The cue has a relation name identifying the relation to be hypothesized if the cue can be successfully applied to the pair of clauses. Each cue further has a cue number used to refer to the cue. Each cue further has an ordered set of conditions, each of which must be satisfied by the clauses, identified as "Clause$_1$," and "Clause$_2$," in order to hypothesize the identified relation based upon the cue. The conditions are ordered in that a first condition is tested and must be satisfied before a second condition is tested. Similarly, for each additional condition of a cue, the condition that precedes it in the order must be evaluated and satisfied before the next condition is evaluated. Finally, each cue has a score indicating the relative likelihood that the identified relation correctly relates the two clauses of the ordered pair given the satisfaction of the ordered set of conditions.

TABLE 4

Discourse Relation Cues

| Relation Name | Cue Number | Condition 1 | Condition 2 | Score |
|---|---|---|---|---|
| ASYMMETRICCONTRAST | H20 | Clause$_1$ is a main clause and, if Clause$_2$ is a subordinate clause, then it must be subordinate to Clause$_1$. | Clause$_2$ contains the subordinating conjunction whereas. | 30 |
| CAUSE | H17 | Clause$_1$ is a main clause and, if Clause$_2$ is a subordinate clause, then it must be subordinate to Clause$_1$. | Clause$_2$ or any of its ancestors contain a cue phrase compatible with the Cause relation (because, | 25 |

TABLE 4-continued

Discourse Relation Cues

| Relation Name | Cue Number | Condition 1 | Condition 2 | Score |
|---|---|---|---|---|
| CAUSE | H18 | Clause$_1$ is not a main clause, or Clause$_2$ is a subordinate clause not subordinate to Clause$_1$. | due_to_the_fact_that, since . . . ). In the logical form, Clause$_2$ is in a CauseBy relation to Clause$_1$. | 10 |
| CAUSE | H29a | Clause$_1$ is not a main clause, or Clause$_2$ is a subordinate clause not subordinate to Clause$_1$. | Clause$_2$ is passive and has the lexical item "cause" as its head. | 10 |
| CAUSE | H29b | Clause$_1$ is not a main clause, or Clause$_2$ is a subordinate clause not subordinate to Clause$_1$. | The head of Clause$_2$ contains the phrase "result/ed/ing/s from." | 10 |
| CIRCUMSTANCE | H12 | Clause$_1$ is a main clause and, if Clause$_2$ is a subordinate clause, then it must be subordinate to Clause$_1$. | Clause$_2$ is dominated by or contains a circumstance conjunction (after, before, while . . . ). | 20 |
| CIRCUMSTANCE | H13 | Clause$_1$ is a main clause and, if Clause$_2$ is a subordinate clause, then it must be subordinate to Clause$_1$. | Clause$_2$ is a detached -ing participial clause and the head of Clause$_2$ precedes the head of Clause$_1$. | 5 |
| CONCESSION | H11 | Clause$_1$ is a main clause and, if Clause$_2$ is a subordinate clause, then it must be subordinate to Clause$_1$. | Clause$_2$ contains a concession conjunction (although, even_though). | 10 |
| CONDITION | H21 | Clause$_1$ is a main clause and, if Clause$_2$ is a subordinate clause, then it must be subordinate to Clause$_1$. | Clause$_2$ contains a condition conjunction (as_long_as, if, unless . . . ). | 10 |
| CONTRAST | H4 | Clause$_1$ precedes Clause$_2$; Clause$_1$ is not syntactically subordinate to Clause$_2$; Clause$_2$ is not syntactically subordinate to Clause$_1$; and the subject of Clause$_2$ is not a demonstrative pronoun, nor is it modified by a demonstrative. | Clause, is dominated by or contains a contrast conjunction (but, however, or . . . ). If Clause$_2$ is in a coordinate structure, then it must be coordinated with Clause$_1$. | 25 |
| CONTRAST | H39 | Clause$_1$ precedes Clause$_2$; Clause$_1$ is not syntactically subordinate to Clause$_2$; Clause$_2$ is not syntactically subordinate to Clause$_1$; and the subject of Clause$_2$ is not a demonstrative pronoun, nor is it modified by a demonstrative. | Cue H4 is satisfied and the head verbs of Clause$_1$ and Clause$_2$ have the same lemma. | 10 |
| CONTRAST | H5 | Clause$_1$ precedes Clause$_2$; Clause$_1$ is not syntactically subordinate to Clause$_2$; Clause$_2$ is not syntactically subordinate to Clause$_1$; and the subject of Clause$_2$ is not a demonstrative pronoun, nor is it modified by a demonstrative. | Clause$_1$ and Clause$_2$ differ in polarity (i. e., one clause is positive and the other negative). | 5 |
| CONTRAST | H6 | Clause$_1$ precedes Clause$_2$; Clause$_1$ is not syntactically subordinate to Clause$_2$; Clause$_2$ is not syntactically subordinate to Clause$_1$; and the subject of Clause$_2$ is not a demonstrative pronoun, nor is it modified by a demonstrative. | The syntactic subject of Clause$_1$ is the pronoun "some" or has the modifier "some" and the subject of Clause$_2$ is the pronoun "other" or has the modifier "other." | 30 |

TABLE 4-continued

Discourse Relation Cues

| Relation Name | Cue Number | Condition 1 | Condition 2 | Score |
|---|---|---|---|---|
| ELABORATION | H24 | $Clause_1$ precedes $Clause_2$; $Clause_1$ is not subordinate to $Clause_2$; and $Clause_2$ is not subordinate to $Clause_1$. | $Clause_1$ is the main clause of a sentence ($sentence_1$) and $Clause_2$ is the main clause of a sentence ($sentence_j$) and $sentence_i$ immediately precedes $sentence_j$ and (a) $Clause_2$ contains an elaboration conjunction (also, for_example) or (b) $Clause_2$ is in a coordinate structure whose parent contains an elaboration conjunction. | 35 |
| ELABORATION | H26 | $Clause_1$ precedes $Clause_2$; $Clause_1$ is not subordinate to $Clause_2$; and $Clause_2$ is not subordinate to $Clause_1$. | Cue H24 applies and $Clause_1$ is the main clause of the first sentence in the excerpt. | 15 |
| ELABORATION | H41 | $Clause_1$ precedes $Clause_2$; $Clause_1$ is not subordinate to $Clause_2$; and $Clause_2$ is not subordinate to $Clause_1$. | $Clause_2$ contains a predicate nominal whose head is in the set {portion component member type kind example instance} or $Clause_2$ contains a predicate whose head verb is in the set {include consist}. | 35 |
| ELABORATION | H25 | $Clause_1$ precedes $Clause_2$; $Clause_1$ is not subordinate to $Clause_2$; and $Clause_2$ is not subordinate to $Clause_1$. | $Clause_1$ and $Clause_2$ are not coordinated and (a) $Clause_1$ and $Clause_2$ exhibit subject continuity or (b) $Clause_2$ is passive and the head of the Dobj of $Clause_1$ and the head of the Dobj of $Clause_2$ are the same lemma or (c) $Clause_2$ contains an elaboration conjunction. | 10 |
| ELABORATION | H25a | $Clause_1$ precedes $Clause_2$; $Clause_1$ is not subordinate to $Clause_2$; and $Clause_2$ is not subordinate to $Clause_1$. | Cue H25 applies and. $Clause_2$ contains a habitual adverb (sometimes, usually . . . ). | 17 |
| ELABORATION | H38 | $Clause_1$ precedes $Clause_2$; $Clause_1$ is not subordinate to $Clause_2$; and $Clause_2$ is not subordinate to $Clause_1$. | Cue H25 applies and the syntactic subject of $Clause_2$ is the pronoun some or contains the modifier some. | 10 |
| JOINT | H0 | No other symmetric relation has been posited between $Clause_1$ and $Clause_2$; $Clause_1$ precedes $Clause_2$; $Clause_1$ is not subordinate to $Clause_2$; $Clause_2$ is not subordinate to $Clause_1$; $Clause_1$ and $Clause_2$ are the same kind of constituent (declarative, interrogative, etc.); the subject of $Clause_2$ is not a demonstrative pronoun, nor is it modified by a demonstrative; if $Clause_1$ has a pronominal subject then $Clause_2$ must also have a pronominal subject; neither $Clause_2$ nor any of the ancestors of $Clause_2$ contain a CONTRAST conjunction, an ASYMMETRICCONTRAST conjunction or an ELABORATION | | 5 |

TABLE 4-continued

Discourse Relation Cues

| Relation Name | Cue Number | Condition 1 | Condition 2 | Score |
|---|---|---|---|---|
| | | conjunction; and if Clause$_2$ is in a coordinate construction, then it must be coordinated with Clause$_1$ by means of a JOINT conjunction (and, and/or). | | |
| LIST | H7 | Clause$_1$ precedes Clause$_2$; Clause$_1$ is not syntactically subordinate to Clause$_2$; Clause$_2$ is not syntactically subordinate to Clause$_1$; the subject of Clause$_2$ is not a demonstrative pronoun, nor is it modified by a demonstrative; Clause$_1$ and Clause$_2$ agree in polarity; there is not alternation where the syntactic subject of Clause$_1$ is the pronoun "some" or has the modifier "some" and the subject of Clause$_2$ is the pronoun "other" or has the modifier "other"; if the syntactic subject of Clause$_2$ is a pronoun, then the syntactic subject of Clause$_1$ must be the same pronoun; and Clause$_2$ is not dominated by and does not contain conjunctions compatible with the CONTRAST, ASYMMETRICCONTRAST or ELABORATION relations. | Clause$_1$ and Clause$_2$ both contain emmeration conjunctions (first second, third . . . ). | 15 |
| LIST | H8 | Clause$_1$ precedes Clause$_2$; Clause$_1$ is not syntactically subordinate to Clause$_2$; Clause$_2$ is not syntactically subordinate to Clause$_1$; the subject of Clause$_2$ is not a demonstrative pronoun, nor is it modified by a demonstrative; Clause$_1$ and Clause$_2$ agree in polarity; there is not alternation where the syntactic subject of Clause$_1$ is the pronoun "some" or has the modifier "some" and the subject of Clause$_2$ is the pronoun "other" or has the modifier "other"; if the syntactic subject of Clause$_2$ is a pronoun, then the syntactic subject of Clause$_1$ must be the same pronoun; and Clause$_2$ is not dominated by and does not contain conjunctions compatible with the CONTRAST, ASYMMETRICCONTRAST or ELABORATION relations. | Clause$_1$ is passive or contains an attributive predicate and Clause$_2$ is passive or contains an attributive predicate. | 10 |
| LIST | H9 | Clause$_1$ precedes Clause$_2$; Clause$_1$ is not syntactically subordinate to Clause$_2$; Clause$_2$ is not syntactically subordinate to Clause$_1$; the subject of Clause$_2$ is not a demonstrative pronoun, | Clause$_2$ is a coordinate construction and the coordinating conjunction is a List conjunction (also, and, lastly . . . ). | 10 |

TABLE 4-continued

Discourse Relation Cues

| Relation Name | Cue Number | Condition 1 | Condition 2 | Score |
|---|---|---|---|---|
| | | nor is it modified by a demonstrative; Clause$_1$ and Clause$_2$ agree in polarity; there is not alternation where the syntactic subject of Clause$_1$ is the pronoun "some" or has the modifier "some". and the subject of Clause$_2$ is the pronoun "other" or has the modifier "other"; if the syntactic subject of Clause$_2$ is a pronoun, then the syntactic subject of Clause$_1$ must be the same pronoun; and Clause$_2$ is not dominated by and does not contain conjunctions compatible with the CONTRAST, ASYMMETRICCONTRAST or ELABORATION relations. | | |
| LIST | H10 | Clause$_1$ precedes Clause$_2$; Clause$_1$ is not syntactically subordinate to Clause$_2$; Clause$_2$ is not syntactically subordinate to Clause$_1$; the subject of Clause$_2$ is not a demonstrative pronoun, nor is it modified by a demonstrative; Clause$_1$ and Clause$_2$ agree in polarity; there is not alternation where the syntactic subject of Clause$_1$ is the pronoun "some" or has the modifier "some" and the subject of Clause$_2$ is the pronoun "other" or has the modifier "other"; if the syntactic subject of Clause$_2$ is a pronoun, then the syntactic subject of Clause$_1$ must be the same pronoun; and Clause$_2$ is not dominated by and does not contain conjunctions compatible with the CONTRAST, ASYMMETRICCONTRAST or ELABORATION relations. | Clause$_1$ and Clause$_2$ both contain a Dobj and the heads of those Dobjs are the same lemma. | 5 |
| PURPOSE | H15 | Clause$_1$ is a main clause and, if Clause$_2$ is a subordinate clause, then it must be subordinate to Clause$_1$. | Clause$_2$ is an infinitival clause. | 5 |
| PURPOSE | H16 | Clause$_1$ is a main clause and, if Clause$_2$ is a subordinate clause, then it must be subordinate to Clause$_1$. | Clause$_2$ or one of the ancestors of Clause$_2$ contains a purpose conjunction (in_order_to, so_that). | 10 |
| RESULT | H22 | Clause$_1$ is a main clause and, if Clause$_2$ is a subordinate clause, then it must be subordinate to Clause$_1$. | The head of Clause$_2$ follows the head of Clause$_1$; and Clause$_2$ is a detached -ing participial clause; and if Clause$_2$ is subordinate to a NP then the parent of that NP must be Clause$_1$. | 15 |
| RESULT | H23 | Clause$_1$ is a main clause and, if Clause$_2$ is a subordinate clause, then it | Clause$_2$ follows Clause$_1$ and Clause$_2$ contains a result conjunction | 35 |

TABLE 4-continued

Discourse Relation Cues

| Relation Name | Cue Number | Condition 1 | Condition 2 | Score |
|---|---|---|---|---|
| RESULT | H31 | must be subordinate to Clause$_1$. Clause$_1$ is not a main clause, or Clause$_2$ is a subordinate clause not subordinate to Clause$_1$. | (as_a_result, consequently, so . . . ). Clause$_2$ has a psychological predicate. | 5 |
| RESULT | H32 | Clause$_1$ is not a main clause, or Clause$_2$ is a subordinate clause not subordinate to Clause$_1$. | Clause$_2$ contains a result conjunction (consequently . . . ). | 10 |
| RESULT | H33 | Clause$_1$ is not a main clause, or Clause$_2$ is a subordinate clause not subordinate to Clause$_1$. | Clause$_2$ contains the phrase "result/ed/ing/s | 10 |
| RESULT | H34 | Clause$_1$ is not a main clause, or Clause$_2$ is a subordinate clause not subordinate to Clause$_1$. | Clause$_2$ is not passive, and the predicate of Clause$_2$ has as its head a verb that entails a result (cause, make . . . ). | 5 |

It can be seen from Table 4 that the set of cues listed there enables the facility to identify discourse relations of the following types: ASYMMETRIC CONTRAST, CAUSE, CIRCUMSTANCE, CONCESSION, CONDITION, CONTRAST, ELABORATION, JOINT, LIST, PURPOSE, AND RESULT. It should be noted that the operation of the facility may be straightforwardly adapted by adding or removing cues to this list. Cues added in this manner for hypothesizing additional relation types can serve to expand the set of relation types that the facility is able to hypothesize and identify within the input text.

For each cue for hypothesizing the current relation, in step 1104, the facility evaluates, in order, the ordered set of conditions associated with the current cue. In step 1105, if that set of conditions is satisfied, then the facility continues in step 1106, else the facility continues in step 1109. In step 1106, if the current relation has already been hypothesized, i.e., the relation occurs on a list of hypothesized relations, then the facility continues in step 1108, else the facility continues in step 1107. In step 1107, the facility adds the relation to the list of hypothesized relations. After step 1107, the facility continues in step 1108. In step 1108, the facility adds the score of the current cue to the total score for the current relation. After step 1108, the facility continues in step 1109. In step 1109, the facility loops back to step 1103 to process the next cue for the current relation. After all of the cues have been processed, the facility continues in step 1110. In step 1110, the facility loops back to step 1102 to process the next relation type for the current ordered pair of clauses. After all of the relation types have been processed, the facility continues in step 1111. In step 1111, the facility loops back to step 1101 to process the next ordered pair of clauses. After all of the ordered pairs of clauses have been processed, these step conclude.

In applying the steps shown in FIG. 11 to the clauses of the example shown in Table 3, the facility hypothesizes the discourse relations shown in Table 5. For each hypothesized relation, Table 5 shows the relation type of the hypothesized relation, the ordered pair of clauses between which the relation is hypothesized, the cues whose condition sets were satisfied, and the total score for each hypothesized relation obtained by summing the scores of the cues whose condition sets were satisfied.

TABLE 5

Hypothesized Relations

| # | Name | Clauses | Cues and bases for cues | Total |
|---|---|---|---|---|
| 1 | ELABORATION | 1, 2 | H25a: "Usually" in Clause 2. H25: The clauses are not coordinated and they exhibit subject continuity since "it" is coreferential with "The aardwolf". | 27 |
| 2 | CONTRAST | 1, 3 | H4: "However" in Clause 3. | 25 |
| 3 | ELABORATION | 1, 3 | H38: The syntactic subject of Clause 3 is modified by "some". H25: Clause 1 is passive and the Dobj of Clause 1 has the same head as the Dobj of Clause 3 ("aardwolf.") | 20 |
| 4 | CONTRAST | 2, 3 | H39: The two clauses have the same main verb. H4: Clause 3 contains "however." | 35 |

TABLE 5-continued

Hypothesized Relations

| # | Name | Clauses | Cues and bases for cues | Total |
|---|---|---|---|---|
| 5 | ELABORATION | 3, 4 | H24: Clause 4 contains "for example" and is the sentence immediately following Clause 3. | 35 |
| 6 | ASYMMETRICCONTRAST | 4, 5 | H20: Clause 5 contains "whereas." | 30 |

Figure 12:
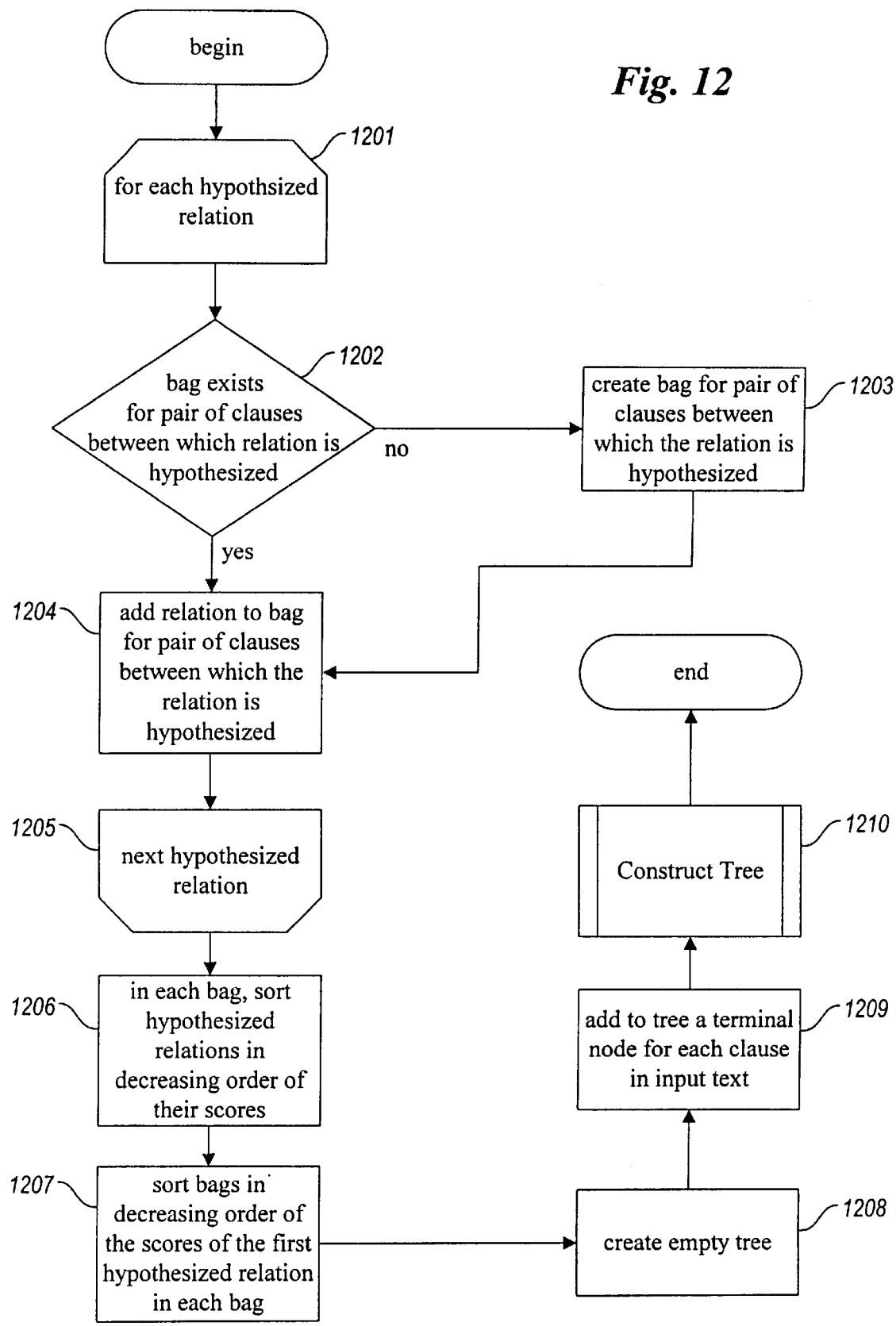
FIG. 12 is a flow diagram showing the steps preferably performed by the facility in order to generate discourse structure trees for the input text.

After the facility has hypothesized relations between the identified clauses in accordance with step 203, the facility proceeds to apply hypothesized relations to construct one or more discourse structure trees for the sample input text in accordance with step 204. FIG. 12 is a flow diagram showing the steps preferably performed by the facility in order to generate discourse structure trees for the sample input text. In step 1201–1205, the facility segregates the hypothesized relations into "bags" to organize them for application. After the segregation, each bag contains all of the hypothesized relations that relate, in either direction, a particular pair of clauses. Thus, a bag is created for each "unordered pair" of clauses that is related by one or more hypothesized relations. Further, the hypothesized relations in each bag are sorted in decreasing order of their scores, and the bags themselves are sorted in decreasing order of their highest scores. This segregation process streamlines the application of the hypothesized relations in several respects. First, segregating the hypothesized relations that relate to a particular pair of propositions into a single bag enables the facility straightforwardly to ensure that each discourse structure tree formed by the application of the hypothesized relations contains no more than one node relating any pair of propositions. Second, sorting the bags and the hypothesized relations within the bags in accordance with their scores and applying the hypothesized relations in this order enables the facility to produce discourse structure trees in decreasing order of likelihood of correctness. In this way, the facility is able to generate quickly the trees most likely to be correct.

In steps 1201–1205, the facility loops through each hypothesized relation. For each hypothesized relation, in step 1202, if a bag exists for the unordered pair of clauses between which the relation is hypothesized, then the facility continues in step 1204, else the facility continues in step 1203. In step 1203, the facility creates a bag for the unordered pair of clauses between which the relation is hypothesized. After step 1203, the facility continues in step 1204. In step 1204, the facility adds the current hypothesized relation to the bag for the unordered pair of clauses between which the relation is hypothesized. In step 1205, the facility loops back to step 1201 to process the next hypothesized relation. After all of the hypothesized relations have been processed, the facility continues in step 1206. In step 1206, the facility sorts the hypothesized relations in each bag in decreasing order of their scores. In step 1207, the facility sorts the bags in decreasing order of the scores of the first hypothesized relation in each bag, i.e., in decreasing order of the largest score among the hypothesized relations in each bag. The sorted bags for the example are shown in Table 6. For example, Bag 5, containing hypothesized relations 2 and 3, is for clauses 1 and 3. It can be seen that the hypothesized relations in bag 5 decline from a score of 25 for hypothesized relation 2 to a score of 20 for hypothesized relation 3. It can further be seen that the maximum scores of the bags decline from a score of 35 for hypothesized relation 4 in bag 1 to a score of 25 for hypothesized relation 2 in bag 5.

TABLE 6

Sorted Bags

| Bag # | Clauses Related | Hypothesized relation number (from Table 5) and score |
|---|---|---|
| 1 | 2 and 3 | 4: Score = 35 |
| 2 | 3 and 4 | 5: Score = 35 |
| 3 | 4 and 5 | 6: Score = 30 |
| 4 | 1 and 2 | 1: Score = 27 |
| 5 | 4 and 5 | 2: Score = 25; 3: Score = 20 |

In step 1208, the facility creates an empty discourse structure tree. In step 1209, the facility adds to this empty tree a terminal node for each clause in the input text. These terminal nodes form the basis for each tree generated for the input text.

Figure 13:
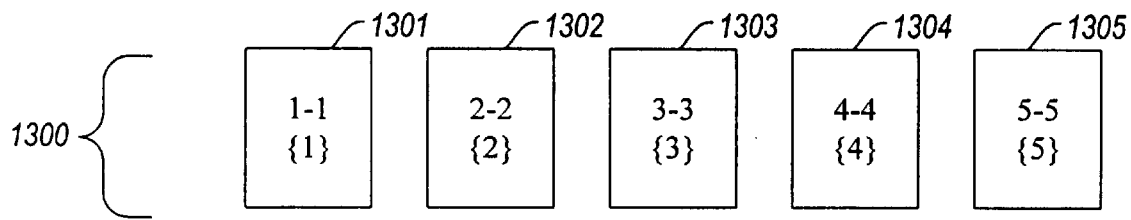
FIG. 13 is a discourse structure tree diagram showing the addition of terminal nodes to the tree.

FIG. 13 is a discourse structure tree diagram showing the addition of terminal nodes to the tree. After such addition, the tree 1300 contains terminal nodes 1301–1305. The first line of text in each node identifies the set of clauses covered by the node. Each of the terminal nodes by definition covers only a single clause. For example, terminal node 1301 covers only clause 1. Each node further indicates the clauses among its covered clauses that are "projected from," or are the most important among, its covered clauses. Again, each terminal node projects its only clause. For example, terminal node 1301 projects its only covered clause, clause 1.

In step 1210, the facility calls a recursive subroutine entitled ConstructTree in order to construct the desired number of discourse structure tree for the input text. After the facility returns from this recursive call, the desired number of trees have been constructed, and these steps conclude. A pseudocode definition of the ConstructTree recursive subroutine is shown in Code Block 1. At a high level, if allowed to run to completion, ConstructTree would create all possible well-formed discourse structure trees that are compatible with the hypothesized discourse relations. As actually implemented, however, the researcher specifies a desired number of trees—usually ten or twenty. ConstructTree then produces either the stipulated number of trees or all possible trees, whichever is the smaller number. Since the algorithm produces better trees first, it is usually not necessary to produce many trees before an analysis is produced that a discourse analyst would consider to be plausible.

The recursive, back-tracking nature of ConstructTree prevents the construction of a great number of ill-formed trees. For example, consider an imaginary set of five hypotheses, $R_1 \ldots R_5$, where applying $R_2$ after $R_1$ results in an invalid tree. Rather than attempting to construct hypotheses by testing all permutations of these five hypotheses and then examining the trees only to discover that trees formed by applying $\{R_1\ R_2\ R_3\ R_4\ R_5\}$ or $\{R_1\ R_2\ R_3\ R_5\ R_4\}$ and so on were invalid, ConstructTree applies $R_1$, then $R_2$. It immediately determines that an ill-formed subtree results, and so does not bother to complete the construction of any trees that would follow from those first two steps. A total of six trees are thus not even produced, resulting in considerable gains in efficiency.

The trees produced by ConstructTree are stored in a list. The Value attribute of the root node of each tree can be used to evaluate a tree—since the Value attribute is determined by adding the heuristic scores of the relations used to construct the tree, a tree constructed by using relations with high heuristic scores will have a greater Value than a tree constructed by using relations with low heuristic scores. Ideally, ConstructTree ought to produce highly ranked trees produced before low ranked ones. Unfortunately, ConstructTree occasionally produces trees out of sequence. To correct this anomalous situation, the list of trees produced by ConstructTree is sorted according to the Value attribute of the root node of each tree, to ensure that a tree judged by a discourse analyst to be the preferred analysis for the text occurs as the top ranked tree, with alternative plausible analyses also occurring near the top of the sorted list.

Figure 14:
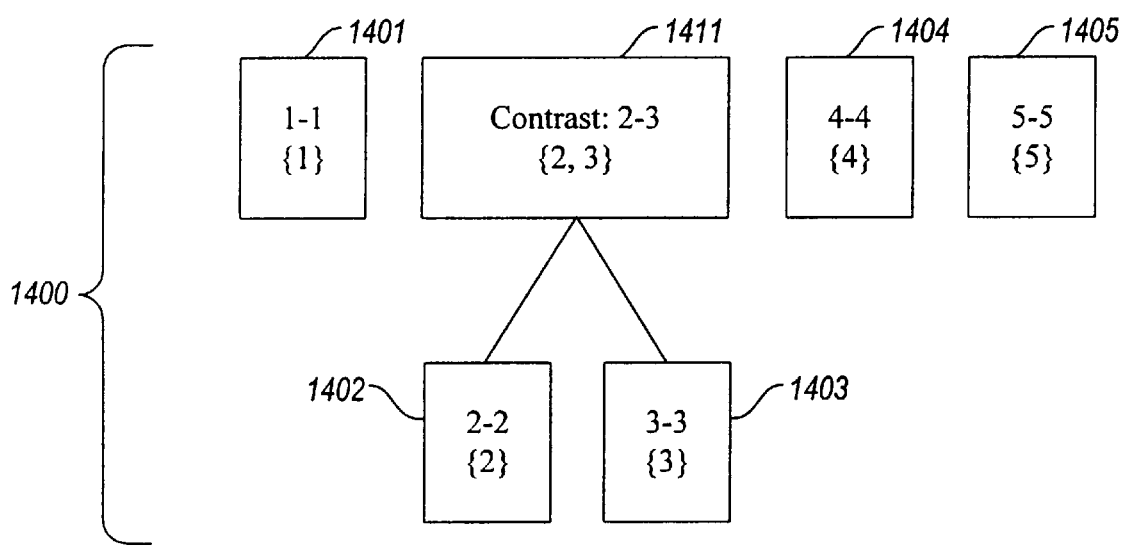
FIG. 14 is a discourse structure tree diagram showing the addition of a new node covering clauses 2–3.

CONTRAST relation between clauses 2 and 3. The facility searches the current nodes of the tree, "TREENODES," for a node whose projections include clause 2 and a node whose projections include clause 3. The facility finds these two nodes. The facility removes the nodes from TREENODES, and combines them to form a new node covering clauses 2 and 3, and adds this new node back into TREENODES. At this point, TREENODES contains the elements given in FIG. 14.

The facility then permutes the other bags, i.e., bags 2, 3, 4, 5. In the first permutation, the first bag is bag 2. The facility attempts to apply the first hypothesized relation in bag 2, hypothesis 5, which specifies an ELABORATION relation with clause 3 as the nucleus and clause 4 as the satellite. The facility searches in TREENODES for a node whose projections include clause 3 and a node whose projections include clause 4. Nodes with these projections are found in TREENODES. The node whose projections include clause 3, the CONTRAST node resulting from the application of the first hypothesis in bag 1, also includes clause 2 in its projections.

Code Block 1: Pseudo-code for ConstructTree Subroutine

```
Function ConstructTree (HYPOTHESES, SUBTREES)
Begin Function ConstructTree
Let COPYHYPOTHESES be equal to a copy of the list HYPOTHESES.
If the desired number of trees have been constructed
    Return.
Else If SUBTREES has only one element:
    If this RST tree is not identical to one that has already been stored, then store it.
    Return.
Else If COPYHYPOTHESES contains at least one element and SUBTREES has more than one element Then
        For each bag in COPYHYPOTHESES
        Let ONEBAG denote the current bag.
        Let REMAININGBAGS be equal to COPYHYPOTHESES except the current bag.
        If projections of elements in SUBTREES match the nucleus and other element (satellite or conucleus)
        specified by the hypothesized relations in ONEBAG, then
            For each hypothesis in ONEBAG, going from the highest scored hypothesis to the lowest scored:
                Let ONEELEMENT denote the current hypothesis
                1.   Search in SUBTREES for elements with the projects specified by ONEELEMENT.
                2.   Let NUC be the subtree whose projections includes the nucleus specified by ONEELEMENT.
                3.   Let OTHER be the subtree whose projections includes the other member (a satellite or a
                     conucleus) specified by ONEELEMENT.
                4.   In ALLHYPOTHESES, there must be a hypothesized relation between every member of the
                     projections of NUC and every member of the projections of OTHER. The relation must be the
                     same as the one specified by ONEELEMENT.
                If (4) is true // begin processing the subtrees whose projects satisfy ONEELEMENT.
                    If combining the subtrees would result in a new node covering a discontinuous set of
                    clauses, then return.
                    Let REMAININGSUBTREES equal SUBTREES.
                    Remove NUC and OTHER from REMAININGSUBTREES.
                    Create a new subtree by joining NUC and OTHER as specified by ONEELEMENT.
                    Set the Pod attribute of this new subtree equal to the heuristic score of the hypothesis used
                    to join these two nodes.
                    Set the Value attribute of this new subtree equal to the heuristic score of the hypothesis used
                    to join these two nodes plus the Value of NUC plus the Value of OTHER.
                    Add this new subtree as the first element of REMAININGSUBTREES.
                    ConstructTree(REMAININGBAGS, REMAININGSUBTREES).
                    If the desired number of trees have been constructed, then return.
                End If // End processing the subtrees whose projects satisfy ONEELEMENT.
            Do the next element in this bag until there are no elements left to do.
        Else // the projections are not found -this bag can therefore not apply in any subsequent permutation
            Remove ONEBAG from COPYHYPOTHESES
        End If
    Do the next bag in COPYHYPOTHESES until there are no bags left to do.
    // End the processing of the remaining bags.
Else // HYPOTHESES is empty.
    Return.
End If
End Function ConstructTree
```

In applying hypothesized relations to generate trees, the facility begins with bag 1, and attempts to apply the first hypothesized relation, relation 4. This relation specifies a The facility can attach clause 4 as a satellite of this node only if the original list of hypothesized relations, "ORIGINALHYPOTHS," includes an ELABORATION relation with clause 2 as a nucleus and clause 4 as a satellite. Since no such relation was hypothesized, it does not occur in ORIGINALHYPOTHS. The facility is therefore unable to attach clause 4 as a satellite of this node.

If bag 2 contained more hypothesized relations, the facility would at this stage move on to consider them. Since bag 2 only contains a single relation, the facility has completed processing of the current bag and moves on to bag 3.

Figure 15:
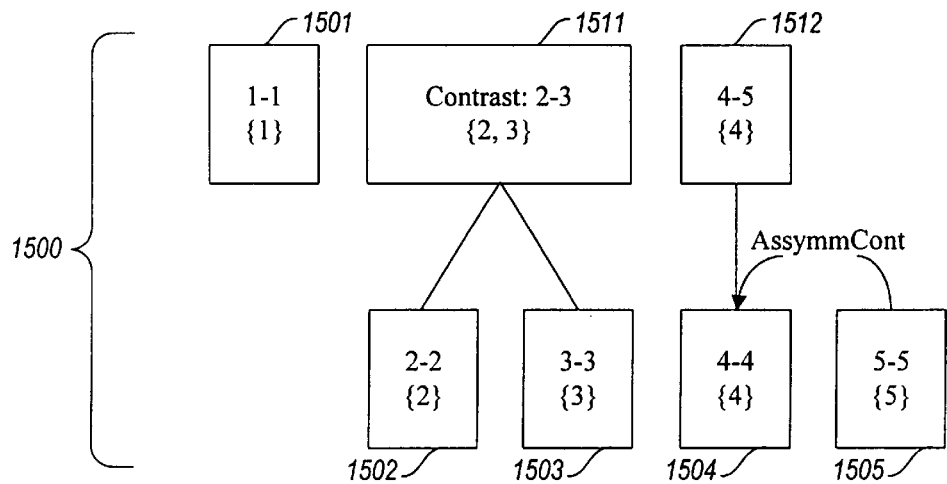
FIG. 15 is a discourse structure tree diagram showing the addition of a new node covering clauses 4 and 5.

The first hypothesized relation in bag 3, relation 6, specifies an ASYMMETRICCONTRAST relation, with clause 4 as the nucleus and clause 5 as the satellite. The facility finds nodes whose projections include these two clauses and creates a new node covering clauses 4 and 5, as illustrated in FIG. 15.

Figure 16:
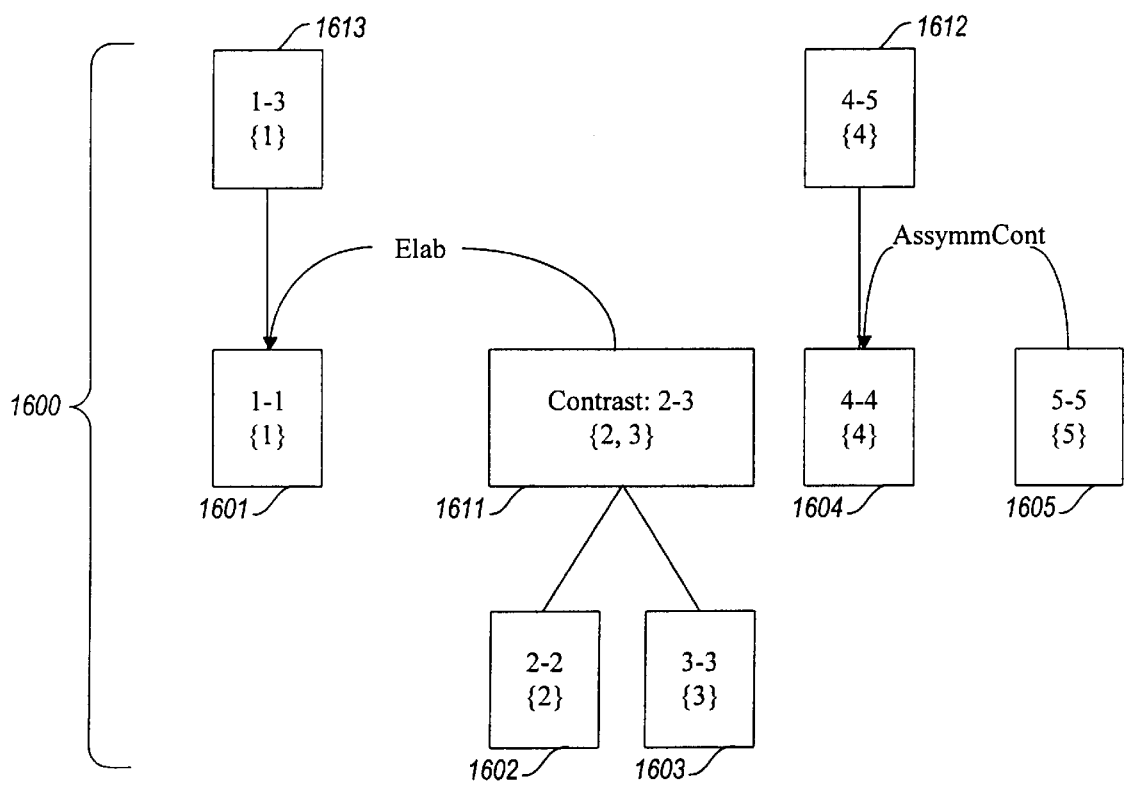
FIG. 16 is a discourse structure tree diagram showing the addition of a new node covering clauses 1–3.

The facility then permutes the other bags, i.e., bags 2, 4, 5. In the first permutation, the first bag is bag 2. As noted above, bag 2 contains a single hypothesized relation that cannot be applied, despite the presence of the projections specified by the relation. The facility therefore proceeds to bag 4, applying relation 1. Relation 1 specifies an ELABORATION relation with clause 1 as the nucleus and clause 2 as the satellite. Nodes with the requisite projections are found. Clause 2 occurs in a node with another projection, clause 3. Since ORIGINALHYPOTHS contains an ELABORATION relation, having clause 1 as the nucleus and clause 3 as the satellite, the facility constructs a new node covering clauses 1 through 3, as shown in FIG. 16.

The facility then permutes the other bags, i.e., bags 2 and 5. In the first permutation, the first bag is bag 2. In TREENODES, the facility is unable to find the two projections that the hypothesized relations in bag 2 cover, namely clauses 3 and 4. The facility therefore prunes all nodes in the search space that follows from the current permutation by removing bag 2 from further consideration. In this particular example, bag 2 contains a single hypothesis and the removal of bag 2 leaves only a single bag, bag 5. However, pruning the search space in this manner frequently yields substantial gains in efficiency. Measurements of the facility's execution indicate that pruning the search space reduces the number of passes through the loop that moves from one bag to the next by approximately one third.

Figure 17:
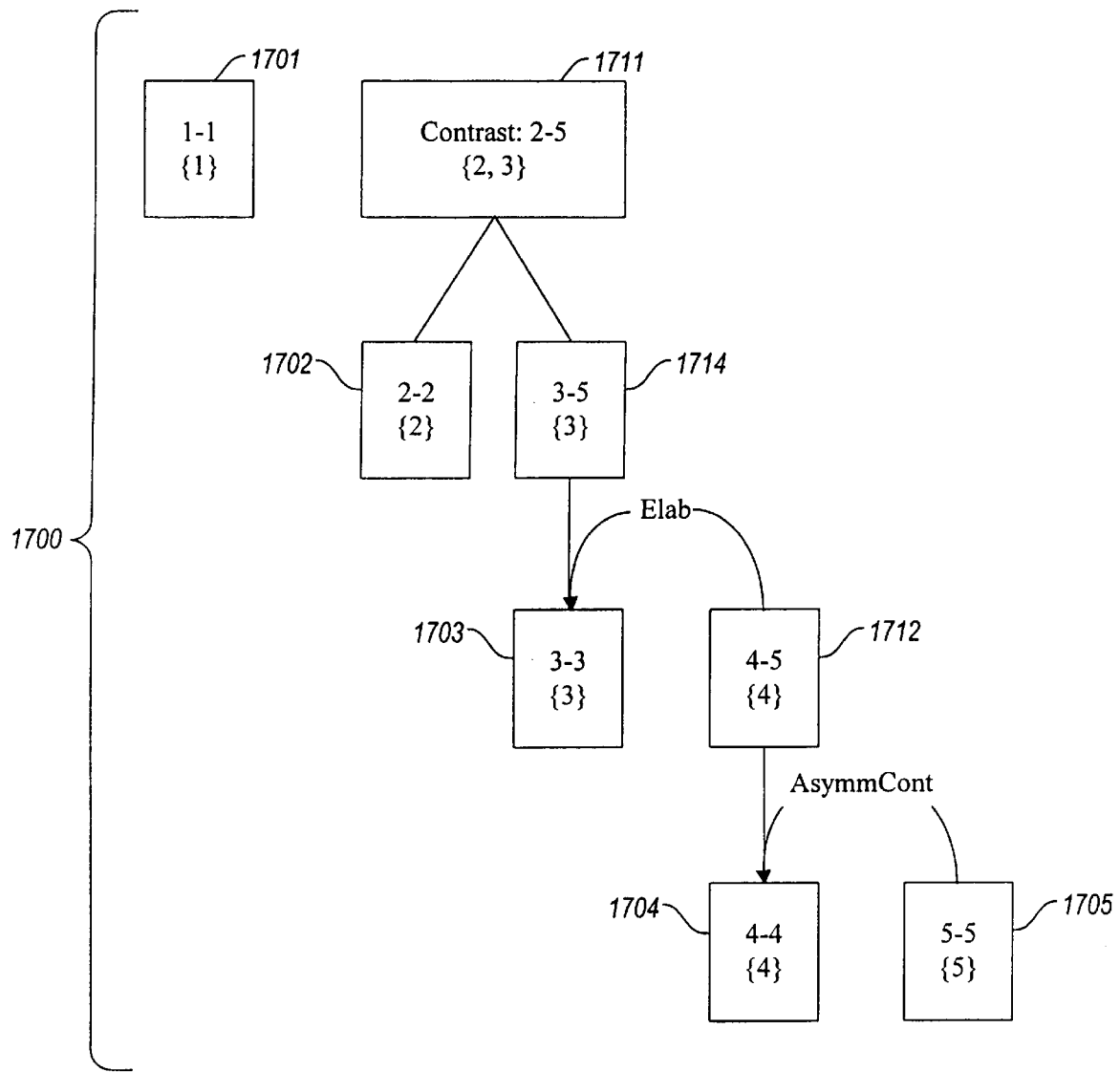
FIG. 17 is a discourse structure tree diagram showing the facility backtracking from the tree shown in FIG. 16 to the tree shown in FIG. 15, then adding a new node covering clauses 3–5.

The facility then moves on to consider bag 5. As with bag 2, the facility is not able to find both projections specified by the hypothesized relations in bag 5. The facility therefore removes bag 5 from further consideration. Since no bags now remain, the facility backtracks to the state of the tree in FIG. 15, and continues processing. Eventually, TREENODES contains the two nodes illustrated in FIG. 17.

The facility then attempts to apply hypothesized relation 1 from bag 4. This relation specifies an ELABORATION relation with clause 1 as the head and clause 2 as a satellite. Both clause 1 and clause 2 are available in the projections of nodes in TREENODES . Clause 2 occurs as the projection of a node whose projections also include clause 3. Because ORIGINALH$_{YPOTHS}$ also includes an ELABORATION relation with clause 1 as the nucleus and clause 3 as the satellite, the facility joins clause 1 and the CONTRAST node that covers clauses 2 through 5. TREENODES now contains a single node covering clauses 1 through 5, as illustrated in FIG. 18. This node is the head of a discourse structure tree representing the sample input text.

The discourse structure trees generated by the facility in step 204 using the ConstructTree subroutine are binary branching trees in which each non-terminal node has two children. For non-terminal nodes representing symmetric relations, these two children are both nuclei. On the other hand, for non-terminal nodes representing asymmetric relations, one of the two child nodes is a more-important nucleus, while the other is a less-important satellite.

While these binary branching discourse structure trees constitute complete representations of the discourse structure of the input text for which they are generated, some users of discourse structure trees prefer that discourse structure trees be presented as n-ary branching trees. In n-ary branching discourse structure trees, a non-terminal node may have an unlimited number of children. Non-terminal nodes representing symmetric relations may have any number of nucleus children. Similarly, non-terminal nodes representing asymmetric relations have one nucleus child, and may have any number of satellite children.

Figure 19:
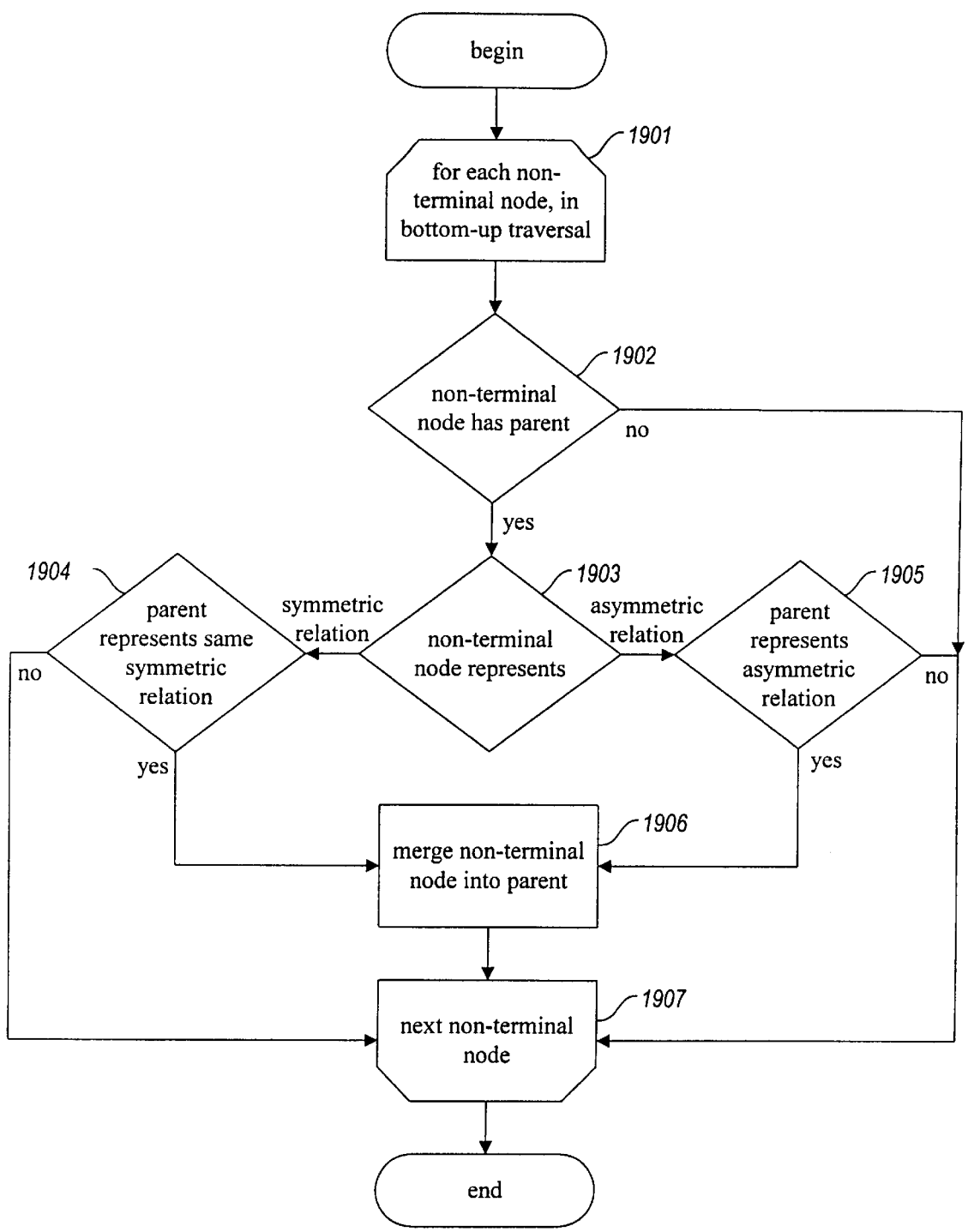
FIG. 19 is a flow diagram showing the steps preferably performed by the facility in order to convert a binary-branching discourse structure tree into an n-ary-branching discourse structure tree.

FIG. 19 is a flow diagram showing the steps preferably performed by the facility in order to convert a binary-branching discourse structure tree into an n-ary-branching discourse structure tree. In steps 1901–1907, the facility loops through each terminal node in the binary branching discourse structure tree, in a bottom-up traversal of the discourse structure tree. For each non-terminal node, if the non-terminal node has a parent, then the facility continues in step 1903, else the facility continues in step 1907. In step 1903, if the non-terminal node represents a symmetric relation, then the facility continues in step 1904, else the non-terminal node represents an asymmetric relation and the facility continues in step 1905. In step 1904 while the current non-terminal node represents a symmetric relation, if the parent of the current non-terminal node represents the same relation type as the current non-terminal node, then the facility continues in step 1906 to merge the current non-terminal node into its parent node, else the facility continues in step 1907. In step 1905 where the current non-terminal node represents an asymmetric relation, if the parent node represents any asymmetric relation, then the facility continues in step 1906 to merge the current non-terminal node into its parent node, else the facility continues in step 1907. After merging the non-terminal node into the parent in step 1906, the facility continues in step 1907. In step 1907, the facility loops back to step 1901 to process the next non-terminal node of the discourse structure tree. After all of the non-terminal nodes of the discourse structure tree have been processed, the binary branching tree has been converted into an n-ary branching tree and these steps conclude.

Figure 20:
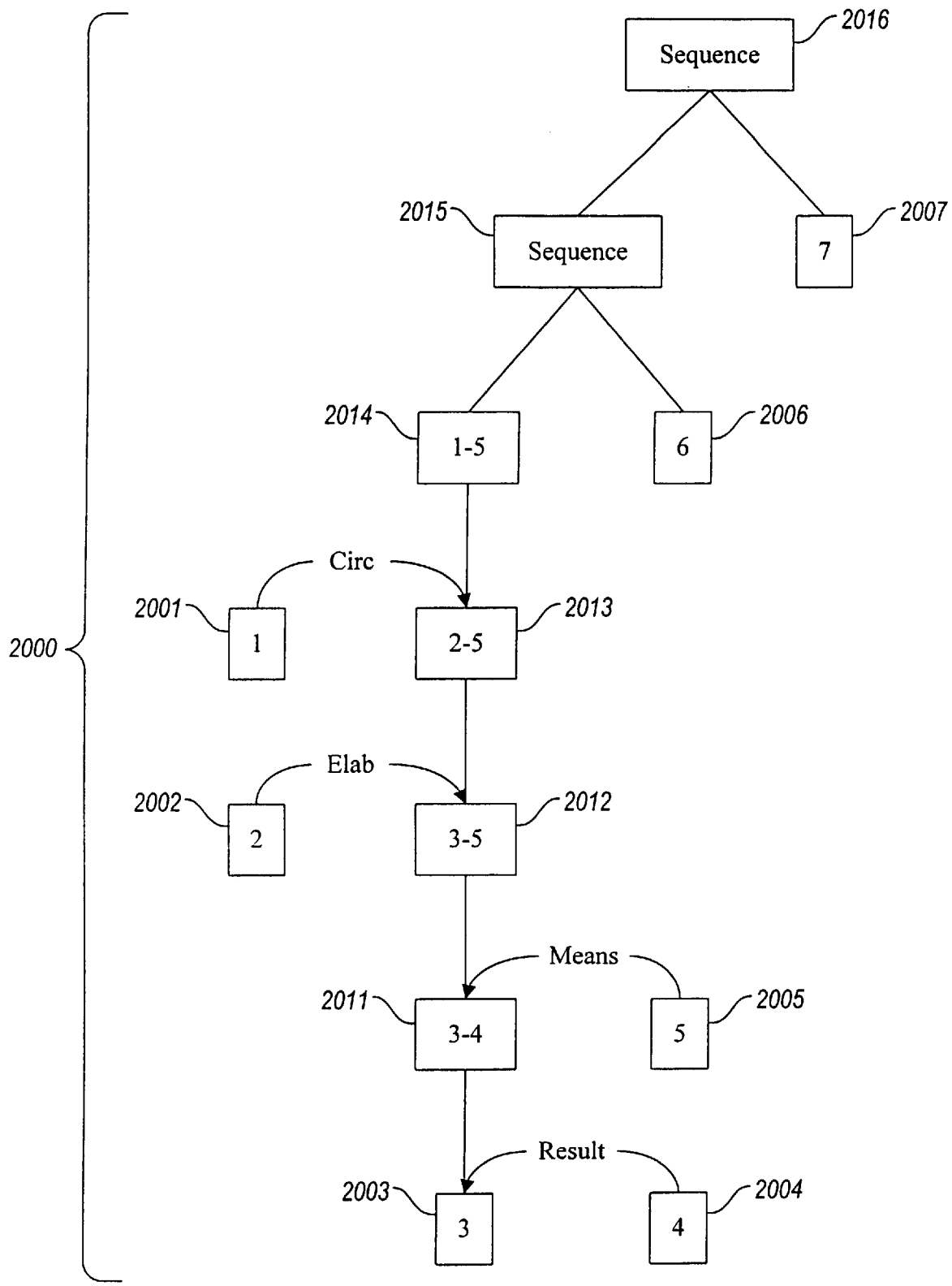
FIG. 20 is a discourse structure tree diagram showing a sample binary branching discourse structure tree.
Figure 21:
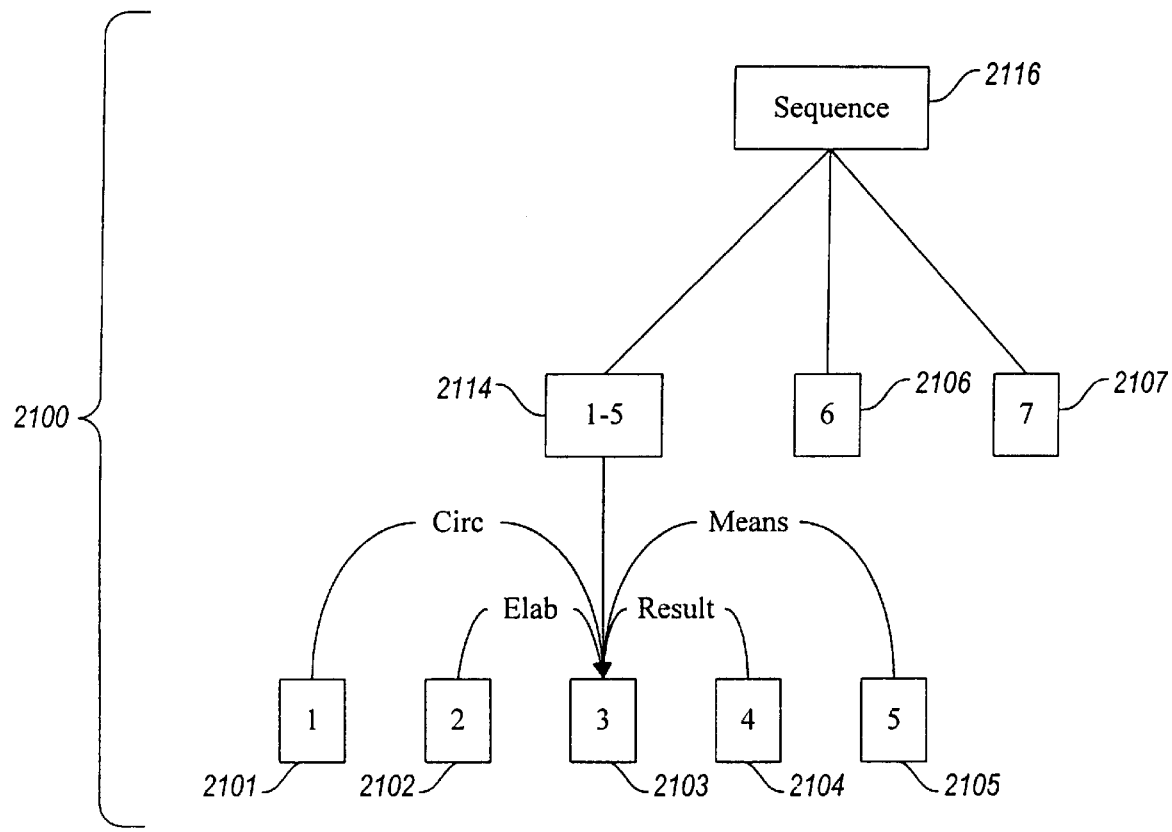
FIG. 21 is a discourse structure tree diagram showing an n-ary branching discourse structure tree constructed by the facility using the steps shown in FIG. 20 from the binary branching discourse structure tree shown in FIG. 21.

FIGS. 20 and 21 illustrate the conversion of a binary branching discourse structure tree into an n-ary branching discourse structure tree. FIG. 20 is a discourse structure tree diagram showing a sample binary branching discourse structure tree. The binary branching discourse structure tree 2000 contains terminal nodes 2001–2007. Non-terminal node 2011 represents a RESULT relation having node 2003 as its nucleus and node 2004 as its satellite. Non-terminal node 2012 represents a MEANS relation having node 2011 as its nucleus and node 2005 as its satellite. Non-terminal node 2013 represents an ELABORATION relation having node 2012 as its nucleus and node 2002 as its satellite. Non-terminal node 2014 represents a CIRCUMSTANCE relation having node 2013 as its nucleus and node 2001as its satellite. Node 2015 represents a SEQUENCE relation having nodes 2014 and 2006 as its nuclei. Finally, non-terminal node 2016 represents a SEQUENCE relation having nodes 2015 and 2007 as its nuclei. It can be seen from FIG. 20 that this discourse structure tree is a binary branching discourse structure tree, as each non-terminal node has exactly two children.

FIG. 21 is a discourse structure tree diagram showing an n-ary branching discourse structure tree constructed by the facility using the steps shown in FIG. 19 from the binary branching discourse structure tree shown in FIG. 20. It can be seen in FIG. 21 that, in the discourse structure tree 2100, non-terminal nodes 2011–2013 shown in FIG. 20 have been combined into node 2014 to form node 2114. Thus, non-terminal node 2014 represents the RESULT relation having node 2103 as its nucleus and node 2104 as its satellite; the MEANS relation having node 2103 as its nucleus and node 2105 as its satellite; the ELABORATION relation having node 2103 as its nucleus and node 2102 as its satellite, and the CIRCUMSTANCE relation having node 2103 as its nucleus and node 2101 as its satellite. Further, non-terminal node 2015 shown in FIG. 20 has been combined into node 2016 to form non-terminal node 2016. As such, non-terminal node 2116 represents a SEQUENCE relation having as its nuclei nodes 2114, 2106, and 2107. Thus, the facility is able to transform any binary branching discourse structure tree into an equivalent n-ary branching discourse structure tree.

Figure 22:
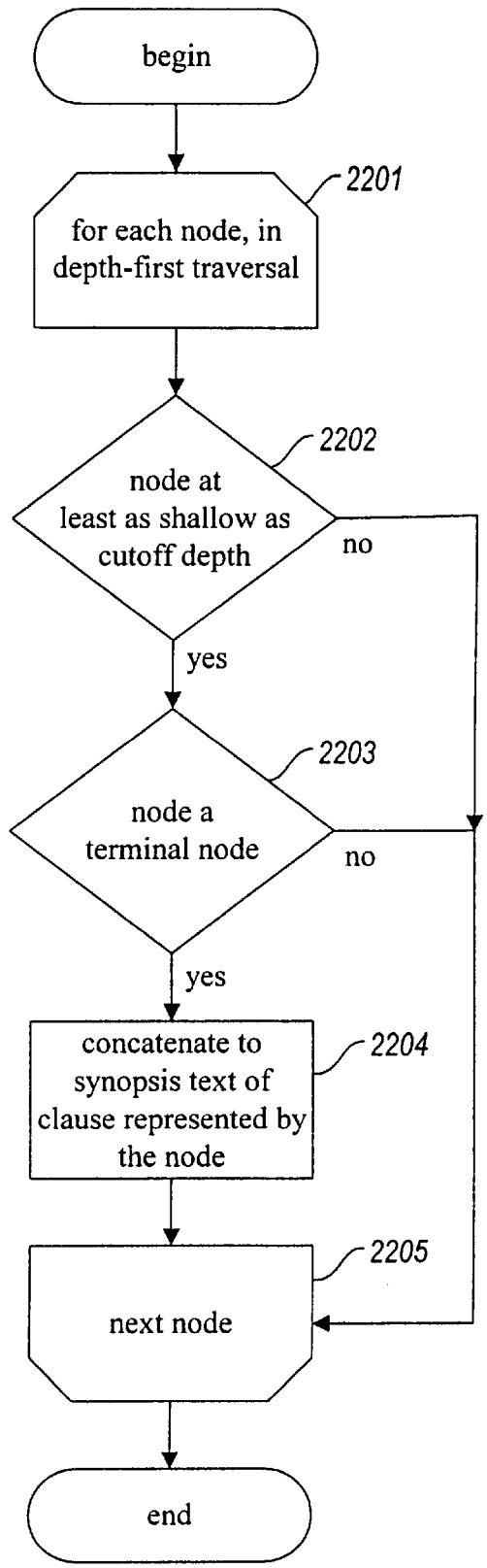
FIG. 22 is a flow diagram showing the steps preferably performed by the facility in order to generate a synopsis of the input text based on the highest-scoring discourse structure tree generated by the facility.

After the facility has converted the generated binary-branching discourse structure trees into n-ary-branching discourse structure trees in accordance with step 205, the facility proceeds to generate a synopsis from the highest-scoring discourse structure tree in accordance with step 206. FIG. 22 is a flow diagram showing the steps preferably performed by the facility in order to generate a synopsis of the input text based on the highest-scoring discourse structure tree generated by the facility. These steps use an integer value, called a "cutoff depth," to determine the level of detail included in the synopsis. The smaller the cutoff depth, the less detailed information is included in the synopsis. In steps 2201–2205, the facility loops through each node in the highest-scoring discourse structure tree in the order of a depth-first traversal. For each node, if the node is at least as shallow in the discourse structure tree at the cutoff depth, then the facility continues in step 2203, else the facility continues in step 2205. The depth of each node is defined to be the number of satellite arcs that separate the node from the head of the discourse structure tree. In step 2203, if the current node is a terminal node in the discourse structure tree, then the facility continues in step 2204, else the facility continues in step 2203. In step 2204, the facility concatenates to the synopsis the text of the clause that is represented by the current node. In step 2205, the facility loops back to step 2201 to process the next node in the depth-first traversal. When all of the nodes have been processed, the synopsis is complete, and these steps conclude, As mentioned above, the level of detail included in the generated synopsis is controlled by the selection of the cutoff depth, which is preferably configurable by the user. Table 7 shows the synopsis generated for the sample input text for each possible cutoff depth. It can be seen from Table 7 that synopses generated with shallower cutoff depths more concisely summarize the input text, while synopses with deeper cutoff depths contain additional levels of detail about the input text.

TABLE 7

Synopsis Generated For Different Cutoff Depths

| Cutoff Depth | Synopsis |
|---|---|
| 0 | The aardwolf is classified as Proteles cristatus. |
| 1 | The aardwolf is classified as Proteles cristatus. It is usually placed in the hyena family, Hyaenidae. Some experts, however, place the aardwolf in a separate family, Protelidae, because of certain anatomical differences between the aardwolf and the hyena. |
| 2 | The aardwolf is classified as Proteles cristatus. It is usually placed in the hyena family, Hyaenidae. Some experts, however, place the aardwolf in a separate family, Protelidae, because of certain anatomical differences between the aardwolf and the hyena. For example, the aardwolf has five toes on its forefeet. |
| 3 | The aardwolf is classified as Proteles cristatus. It is usually placed in the hyena family, Hyaenidae. Some experts, however, place the aardwolf in a separate family, Protelidae, because of certain anatomical differences between the aardwolf and the hyena. For example, the aardwolf has five toes on its forefeet, whereas the hyena has four. |

While this invention has been shown and described with reference to exemplary embodiments, it will be understood by those skilled in the art that various changes or modifications in form and detail may be made without departing from the scope of the invention. For example, the facility may be used to determine the discourse structure within a sample input text where the text of a terminal node is either larger or smaller than the clauses discussed herein. Also, the facility may be used to determine the discourse structure within forms of natural language expression other than text, such as speech and visual signing, or of "written" natural language that is expressed in a non-textual form, such as a list of references into a lexical knowledge base. Further, the facility may be straightforwardly adapted to use syntactic and semantic information about the input text obtained from sources other than a parser, such as syntactic and semantic information obtained from a precompiled lexical knowledge base.

We claim:

1. A method in a computer system for generating a list of discourse structure trees for an input text that characterizes the discourse structure of the input text, the method utilizing syntactic information associated with the input text, the method comprising the steps of:
    dividing the input text into a plurality of clauses;
    for each ordered pair of the plurality of clauses:
        for each of a multiplicity of discourse relations:
            retrieving one or more ordered sets of conditions for hypothesizing the discourse relation, each condition directed to the syntactic information relating to the ordered pair of clauses;
            determining which of the retrieved sets of conditions are completely satisfied by the syntactic information relative to the pair of clauses, evaluating the conditions of each set in the order of the conditions in the set; and
        where the conditions of at least one set are satisfied:
            generating an indication that the discourse relation is hypothesized between the ordered pair of clauses, and
            generating for the hypothesized relation a quantitative relation score reflecting the relative likelihood that that the discourse relation is properly hypothesized, the quantitative score obtained by summing quantitative scores associated with the satisfied sets of conditions that, in each case, reflects the likelihood that the discourse relation is properly hypothesized in view of the satisfaction of the satisfied set of conditions;
    organizing the hypothesized relations into lists each containing the relations hypothesized between a different pair of clauses;

applying to the identified clauses the hypothesized relations of the lists beginning from the list containing the highest relation score in the order of the relation scores; and storing in a list of discourse structure trees each complete, correct, unique discourse structure tree generated by applying the hypothesized relations.

2. The method of claim 1, further comprising the step of parsing the input text to derive the syntactic information associated with the input text.

3. The method of claim 2, further comprising the step of normalizing the syntactic information derived during the parsing step to produce a logical form, and wherein the determining step is performed using the produced logical form.

4. The method of claim 1, further comprising the steps of:

generating a score for each stored discourse structure tree characterizing the relative likelihood that the discourse structure tree correctly characterizes the discourse structure of the input text, by summing the relation scores of the relations comprising the discourse structure tree; and ranking the list of discourse structure trees in accordance with the scores of the trees.

5. The method of claim 1 wherein the method further utilizes semantic information associated with the input text, and wherein a portion of the conditions evaluated by the evaluating step are conditions relating to the semantic information.

6. The method of claim 1, further comprising the step of selecting a maximum number of discourse structure trees to generate, and wherein the steps conclude after the maximum number of distinct discourse structure trees have been stored.

7. The method of claim 6 wherein the step of selecting a maximum number of discourse structure trees to generate selects a maximum number of one.

8. The method of claim 1, further comprising the steps of:

selecting a maximum number of discourse structure trees to store; and where the operation of the storing step stores causes the number of stored discourse structure trees to exceed of the maximum number of discourse structure trees, deleting the stored discourse structure tree having the lowest score.

9. The method of claim 8 wherein the step of selecting a maximum number of discourse structure trees to store selects a maximum number of one.

10. The method of claim 1 wherein the generated discourse structure tree is a binary tree in which each non-terminal node has exactly two children, further comprising the step of transforming the binary discourse structure tree into an n-ary discourse structure tree by, for each non-terminal node, if the non-terminal node represents an asymmetric relation and one of its children represents an asymmetric relation, or if the non-terminal node represents a symmetric relation and one of its children represents a symmetric relation of the same type, deleting the child node and attaching the children of the child node to the non-terminal node.

11. The method of claim 10 wherein the transforming step traverses the generated discourse structure tree in a depth-first manner.

12. A method in a computer system for generating a discourse structure tree for an input text that characterizes the discourse structure of the input text, the method utilizing syntactic information associated with the input text, the method comprising the steps of:

identifying in the input text a plurality of clauses;

for each pair of clauses, determining which of a plurality of possible discourse relations to hypothesize between the pair of clauses based upon the syntactic structure of the input text relative to the pair of clauses; and applying the hypothesized relations to the clauses to produce a discourse structure tree characterizing the discourse structure of the input text.

13. The method of claim 12, further comprising the step of generating from the input text a syntactic parse tree containing the syntactic information utilized by the method.

14. The method of claim 12, further comprising the step of generating from the input text a logical form containing at least a portion of the syntactic information utilized by the method.

15. The method of claim 12 wherein the method further utilizes semantic information associated with the input text, and wherein the determining step determines to hypothesize a discourse relation between a selected pair of clauses based upon the semantic information relative to the selected pair of clauses.

16. The method of claim 12 wherein the method further utilizes information relating to words within the input text procured from a lexical knowledge base, and wherein the determining step determines to hypothesize the discourse relation between a selected pair of clauses based upon the information procured from a lexical knowledge base relative to words occurring in the selected pair of clauses.

17. The method of claim 12 wherein the produced tree is comprised of nodes each having a depth in the tree, the nodes including clause nodes representing clauses identified in the input text and relation nodes representing relations applied to the clauses, further comprising the step of generating a synopsis of the input text by eliminating from the input text clauses whose clause nodes have a depth in the tree that is deeper than a predetermined cutoff depth.

18. The method of claim 12 wherein the generated discourse structure tree is a binary tree in which each non-terminal node has exactly two children, further comprising the step of transforming the binary discourse structure tree into an n-ary discourse structure tree by, for each non-terminal node, if the non-terminal node represents an asymmetric relation and one of its children represents an asymmetric relation, or if the non-terminal node represents a symmetric relation and one of its children represents a symmetric relation of the same type, deleting the child node and attaching the children of the child node to the non-terminal node.

19. A computer-readable medium whose contents cause a computer system to generate a discourse structure tree for a natural language expression that characterizes the discourse structure of the natural language expression, utilizing syntactic information associated with the natural language expression, by performing the steps of:

selecting in the natural language expression a plurality of clauses;

for each pair of clauses, determining which of a plurality of possible discourse relations to hypothesize between the pair of clauses based upon the syntactic structure of the natural language expression relative to the pair of clauses; and applying the hypothesized relations to the clauses to produce a discourse structure tree characterizing the discourse structure of the natural language expression.

20. The computer-readable medium of claim 19 wherein the contents of the computer-readable medium further cause the computer system to perform the step of receiving the natural language expression as a body of text.

21. The computer-readable medium of claim 19 wherein the contents of the computer-readable medium further cause the computer system to perform the step of receiving the natural language expression as a body of speech.

22. The computer-readable medium of claim 19 wherein the contents of the computer-readable medium further cause the computer system to perform the step of receiving the natural language expression as a body of visual signing.

23. The computer-readable medium of claim 19 wherein the determining step determines to hypothesize the discourse relation between a selected pair of clauses based upon the information procured from a lexical knowledge base relative to words occurring in the selected pair of clauses.

24. The computer-readable medium of claim 19 wherein the contents of the computer-readable medium further cause the computer system to perform the step of generating from the natural language expression a syntactic parse result containing the syntactic information utilized by the method.

25. The computer-readable medium of claim 19 wherein the contents of the computer-readable medium further cause the computer system to perform the step of generating from the natural language expression a logical form containing at least a portion of the syntactic information utilized by the method.

26. The computer-readable medium of claim 19 wherein semantic information associated with the natural language expression is further utilized, and wherein the determining step determines to hypothesize a discourse relation between a distinguished pair of clauses based upon the semantic information relative to the selected pair of clauses.

27. The computer-readable medium of claim 19 wherein the produced tree is comprised of nodes each having a depth in the tree, the nodes including clause nodes representing clauses identified in the natural language expression and relation nodes representing relations applied to the clauses, and wherein the contents of the computer-readable medium further cause the computer system to perform the step of generating a summary of the natural language expression by eliminating from the natural language expression clauses whose clause nodes have a depth in the tree that is deeper than a predetermined cutoff depth.

28. A method in a computer system for determining a quantitative score for a discourse structure tree that reflects the likelihood that the discourse structure tree correctly characterizes the discourse structure of a body of text comprised of clauses, the discourse structure tree comprising nodes representing clauses, the nodes including both terminal nodes and non-terminal nodes, the non-terminal nodes each identifying a discourse relation between two or more child nodes, exactly one of the nodes being a root node that is not the child of any node, the method comprising the steps of:

for each non-terminal node:
determining a quantitative score for the discourse relation represented by the current node that reflects the likelihood that the discourse relation has been correctly recognized between the clauses represented by the child nodes of the current node,
combining the scores of any non-terminal child nodes with the score of the discourse relation represented by the current node, and attributing to the current node the combined score; and
attributing to the discourse structure tree the score of the root node.

29. The method of claim 28 wherein the combining step comprises the step of summing the scores of any non-terminal child nodes with the score of the discourse relation represented by the current node.

30. The method of claim 28, further comprising the steps of:
repeating the recited steps for each of a plurality of discourse structure trees characterizing the discourse structure of the body of text to attribute a score to each discourse structure tree of the plurality; and
selecting as the preferred discourse structure tree a discourse structure tree to which the largest score is attributed.

31. A computer memory containing a discourse relation hypothesizing data structure for use in hypothesizing discourse relations between a pair of clauses, the data structure comprising, for each of a plurality of relations, a list of one or more entries each containing:
a list of conditions having an indicated order of application to syntactic information relating to the pair of clauses; and
a quantitative score reflecting the relative likelihood that the relation correctly relates the pair of clauses where the list of conditions is satisfied,
such that, for the pair of clauses, for one or more of the relations, for each of the entries, the list of conditions may be applied to syntactic information relating to the pair of clauses, and, if the list of conditions is satisfied, the quantitative score may be combined into an overall quantitative score of the relative likelihood that the relation correctly relates the pair of clauses.

32. A computer memory containing a discourse relation hypothesizing data structure for use in hypothesizing discourse relations between a pair of clauses, the data structure comprising, for each of a plurality of relations, a list of one or more entries each containing:
a list of conditions having an indicated order of application to syntactic and semantic information relating to the pair of clauses; and
a quantitative score reflecting the relative likelihood that the relation correctly relates the pair of clauses where the list of conditions is satisfied, such that, for the pair of clauses, for one or more of the relations, for each of the entries, the list of conditions may be applied to syntactic and semantic information relating to the pair of clauses, and, if the list of conditions is satisfied, the quantitative score may be combined into an overall quantitative score of the relative likelihood that the relation correctly relates the pair of clauses.

33. A computer memory containing a discourse relation hypothesizing data structure for use in hypothesizing discourse relations between a pair of clauses each comprising a series of words, the data structure comprising, for each of a plurality of relations, a list of one or more entries each containing:
a list of conditions having an indicated order of application to information available from a lexical knowledge base relating to words within the pair of clauses; and
a quantitative score reflecting the relative likelihood that the relation correctly relates the pair of clauses where the list of conditions is satisfied,
such that, for the pair of clauses, for one or more of the relations, for each of the entries, the list of conditions may be applied to information relating to words within the pair of clauses procured from a lexical knowledge base, and, if the list of conditions is satisfied, the quantitative score may be combined into an overall quantitative score of the relative likelihood that the relation correctly relates the pair of clauses.

34. A method in a computer system for recognizing one or more likely discourse relations between a pair of clauses occurring in a body of natural language text, the method comprising the steps of, for each of a plurality of possible relations:

obtaining for the current possible relation one or more ordered sets of conditions, each condition relating to the syntactic structure of the body of text relative to the pair of clauses; and for each obtained ordered set of conditions, determining, in accordance with the order of the set, whether each of the conditions of the set is satisfied by the syntactic structure of the body of text relative to the pair of clauses, and if each of the conditions of the set is satisfied, recognizing the current possible relation as a likely relation between the pair of clauses.

35. The method of claim 34, further comprising the steps of, for each of the ordered sets of conditions determined to be satisfied:

obtaining a quantitative score associated with the satisfied ordered set of conditions representing the likelihood that the current possible discourse relation has been correctly recognized between the clauses based upon the satisfaction of the satisfied ordered set of conditions; and summing the obtained quantitative score into a total score for the current possible discourse relation, such that, after the performance of the steps, each relation recognized as a likely relation has a total score representing the relative likelihood that the relation has been correctly recognized between the clauses in view of all of the sets of conditions that are satisfied for the relation.

36. An apparatus for recognizing one or more likely discourse relations between two clauses occurring in a body of natural language text, comprising:

for each of a plurality of possible relations a memory storing, for each of a plurality of possible relations, one or more sets of conditions, each condition relating to the syntactic structure of the body of text relative to the two clauses; and a likely relation recognition subsystem that, for each of the plurality of possible relations, recognizes the possible relation as a likely relation between the two clauses where each of the conditions of at least one of the sets of conditions is satisfied by the syntactic structure of the body of text relative to the pair of clauses.

37. The apparatus of claim 36 wherein the memory further stores, for each of the ordered sets of conditions determined to be satisfied, a quantitative score associated with the satisfied ordered set of conditions representing the likelihood that the current possible discourse relation has been correctly recognized between the clauses based upon the satisfaction of the satisfied ordered set of conditions, the apparatus further comprising a scoring subsystem that, for each of the ordered sets of conditions determined to be satisfied, sums the obtained quantitative score into a total score for the current possible discourse relation, such that, after the operation of the apparatus, each relation recognized as a likely relation has a total score representing the relative likelihood that the relation has been correctly recognized between the clauses in view of all of the sets of conditions that are satisfied for the relation.

38. A computer memory containing a hypothesized discourse relation data structure representing a set of discourse relations each hypothesized for at least one pair of a plurality of clauses occurring in an input text, the data structure for generating one or more discourse structure trees for the input text, the data structure comprising:

a plurality of bags, each bag containing a list of discourse relations hypothesized between a different pair of clauses, the list being ordered in accordance with the relative likelihood that each discourse relation correctly relates the pair of clauses for which it is hypothesized, the bags being ordered in decreasing order of the maximum likelihood of the discourse relations in the lists contained by the bags, such that, by applying the hypothesized discourse relations in accordance with a traversal of the lists of the bags, a discourse structure tree characterizing the discourse structure of the input text may be generated.

* * * * *

UNITED STATES PATENT AND TRADEMARK OFFICE
CERTIFICATE OF CORRECTION

PATENT NO. : 6,112,168
DATED : August 29, 2000
INVENTOR(S) : Simon Corston et al.

It is certified that error appears in the above-identified patent and that said Letters Patent is hereby corrected as shown below:

Col. 5, line 12, "805" should be --1805--.
Col. 5, line 14, "803" should be --1803--.
Col. 14, "sentence$_1$" should be --sentence$_i$--.
Col. 14, "clause:" should be --clause$_i$--.
Col. 20, insert --in"--.
Col. 20, line 37, "step" should be --steps--.
Col. 25, line 55, "ORIGINALHypoths" should be -- ORIGINALHYPOTHS--.
Col. 27, line 12, "2016" should be --2116--.

Signed and Sealed this

First Day of May, 2001

*Attest:*

NICHOLAS P. GODICI

*Attesting Officer*  *Acting Director of the United States Patent and Trademark Office*